Nov. 17, 1953     J. H. GIBBON, JR., ET AL     2,659,368
EXTRACORPOREAL CIRCULATION DEVICE

Filed May 28, 1949     16 Sheets-Sheet 1

INVENTORS
JOHN H. GIBBON JR., GUSTAV V. A. MALMROS
JOHN R. ENGSTROM, & EDMUND A. BARBER JR.
BY
Robert S. Dunham
ATTORNEY INVENTORS
JOHN H. GIBBON JR., GUSTAV V. A. MALMROS
JOHN R. ENGSTROM, & EDMUND A. BARBER Jr
BY
Robert S. Dunham
ATTORNEY

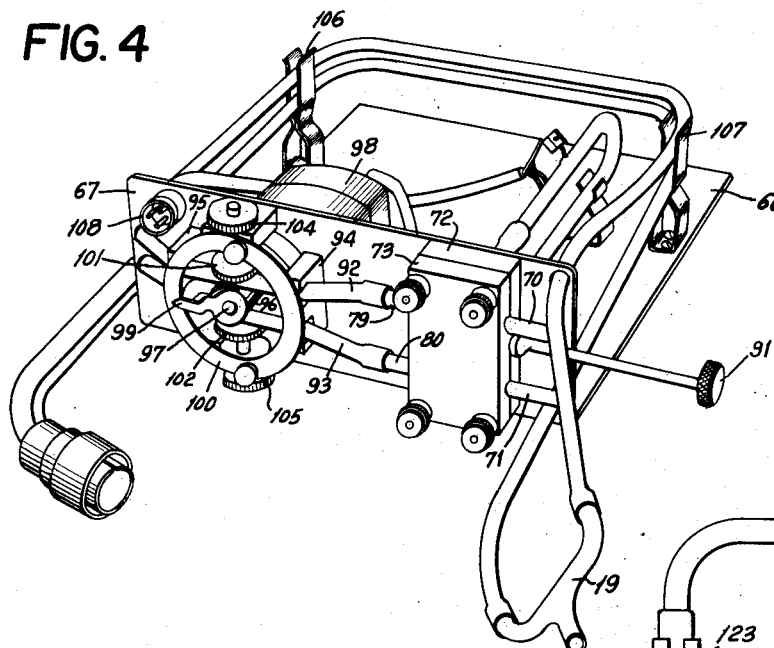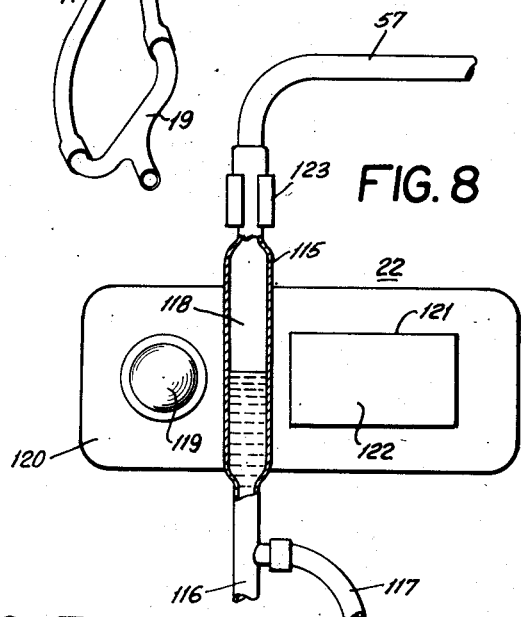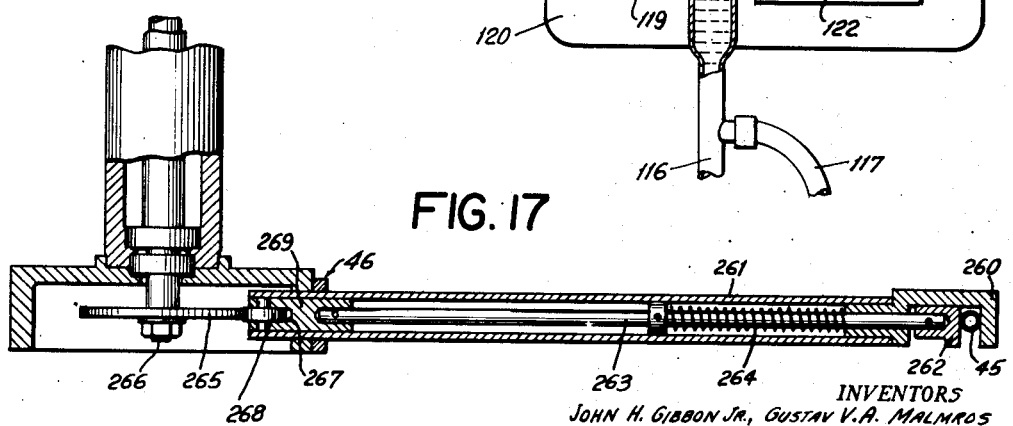

Nov. 17, 1953  J. H. GIBBON, JR., ET AL  2,659,368
EXTRACORPOREAL CIRCULATION DEVICE
Filed May 28, 1949  16 Sheets-Sheet 5
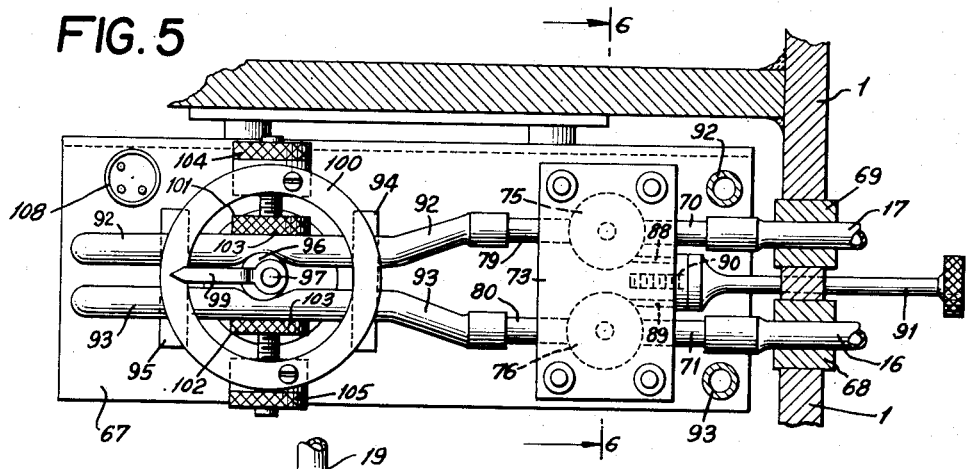
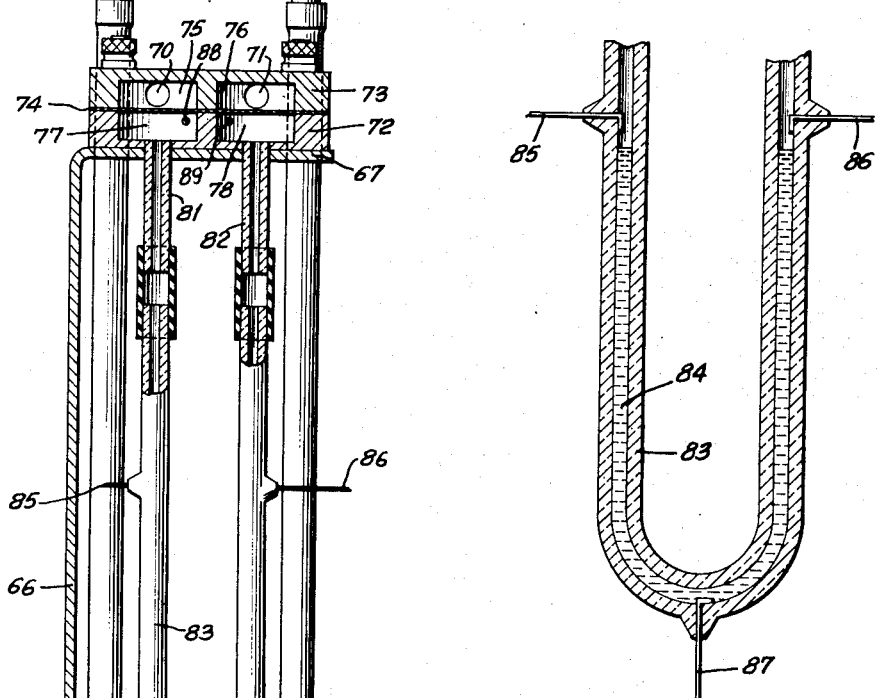
INVENTORS
JOHN H. GIBBON JR., GUSTAV V. A. MALMROS
JOHN R. ENGSTROM, & EDMUND A. BARBER JR.
BY
Robert S. Dunham
ATTORNEY Nov. 17, 1953  J. H. GIBBON, JR., ET AL  2,659,368
EXTRACORPOREAL CIRCULATION DEVICE
Filed May 28, 1949  16 Sheets-Sheet 6
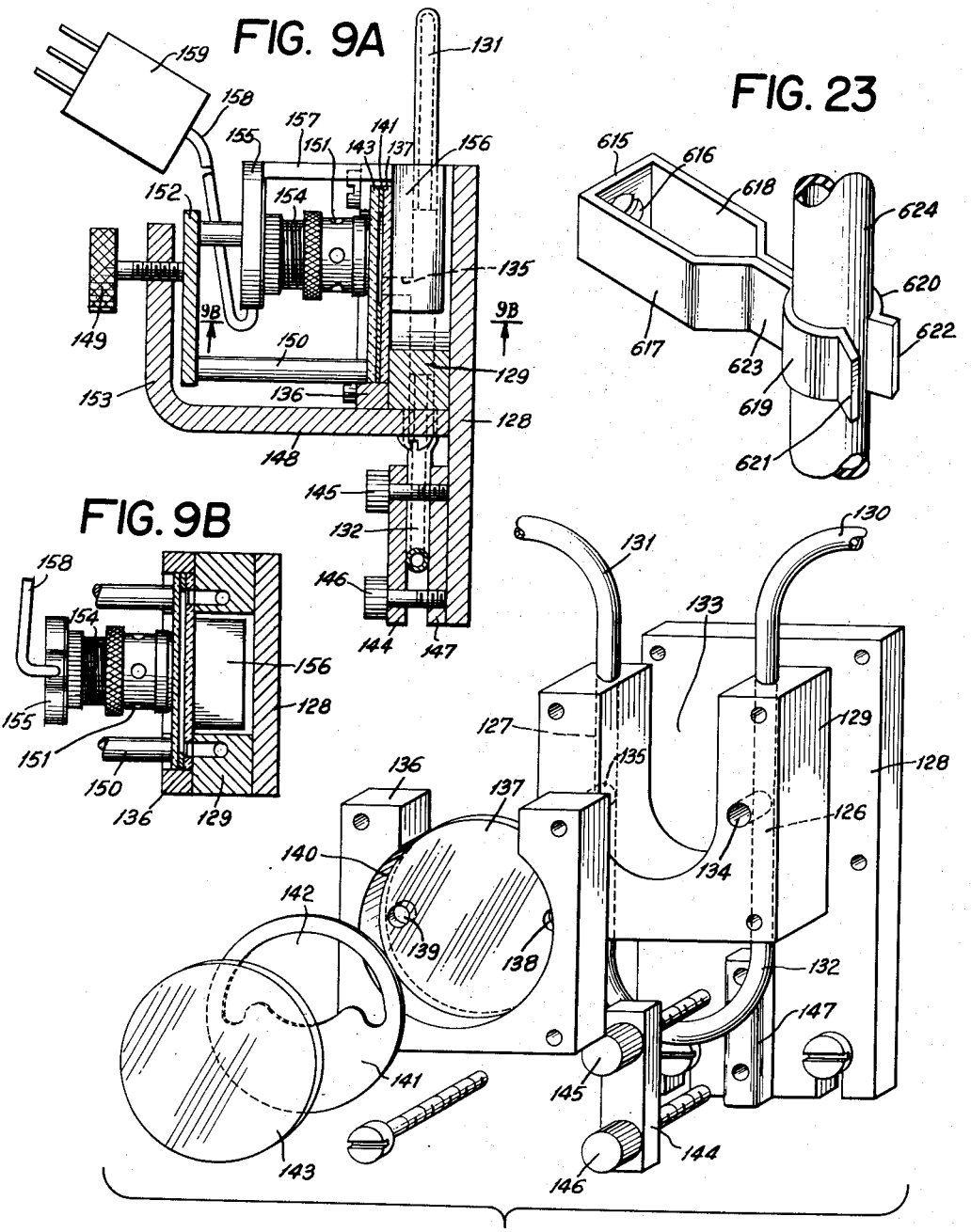
INVENTORS
JOHN H. GIBBON JR., GUSTAV V.A. MALMROS
JOHN R. ENGSTROM, & EDMUND A. BARBER JR.
BY
Robert S. Dunham
ATTORNEY Nov. 17, 1953 J. H. GIBBON, JR., ET AL 2,659,368
EXTRACORPOREAL CIRCULATION DEVICE
Filed May 28, 1949 16 Sheets—Sheet 7
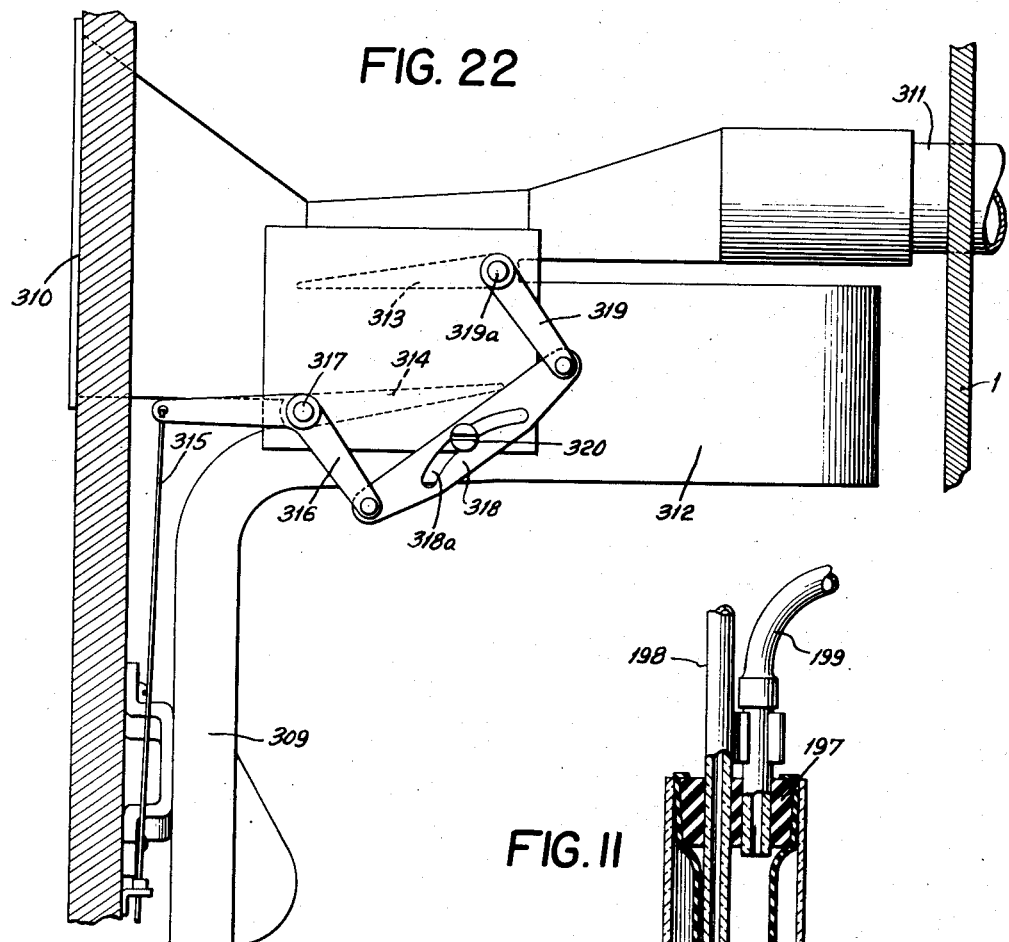
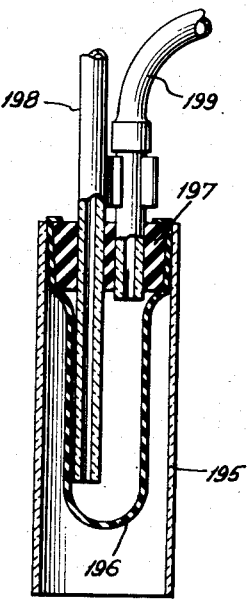
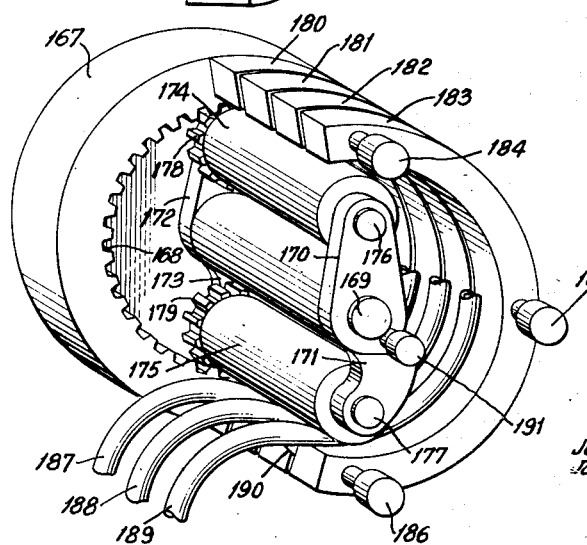
INVENTORS
JOHN H. GIBBON JR., GUSTAV V.A. MALMROS,
JOHN R. ENGSTROM, & EDMUND A. BARBER JR.
BY Robert S. Dunlam
ATTORNEY

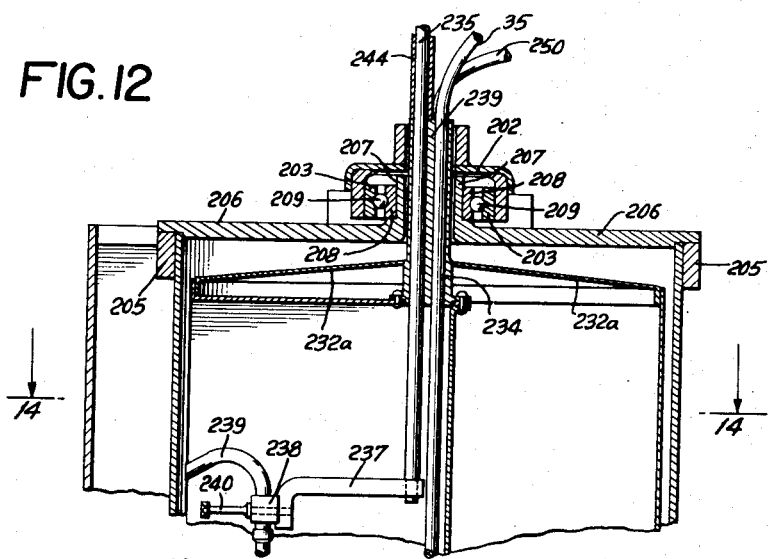
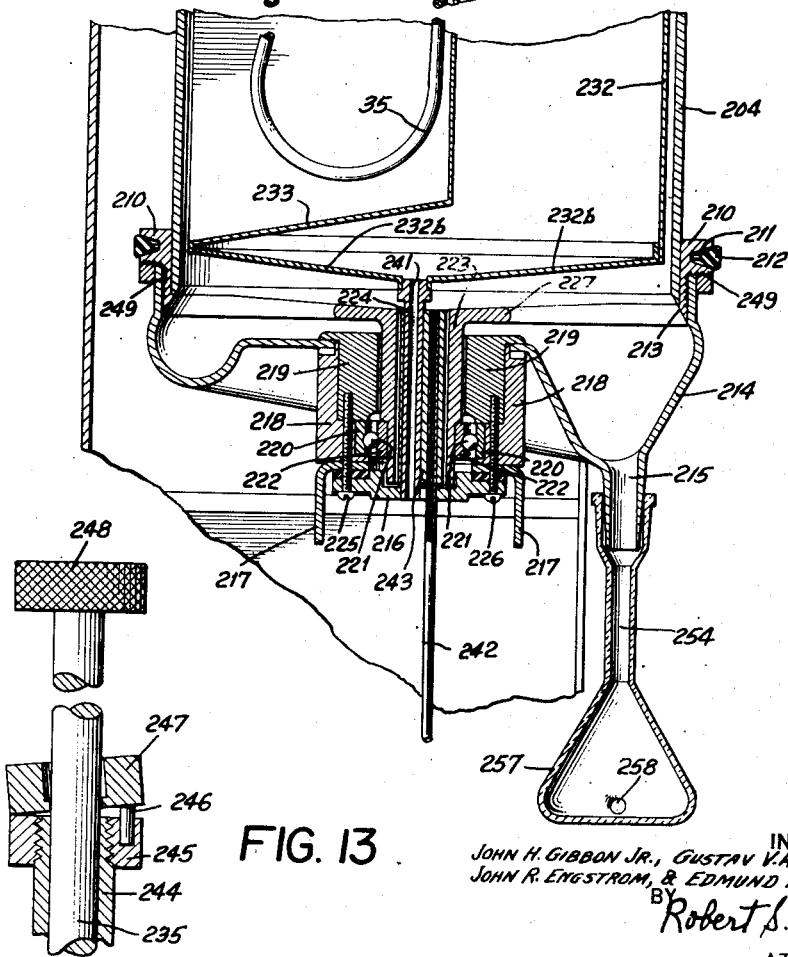

Nov. 17, 1953

J. H. GIBBON, JR., ET AL 2,659,368

EXTRACORPOREAL CIRCULATION DEVICE

Filed May 28, 1949

INVENTORS
JOHN H. GIBBON JR., GUSTAV V.A. MALMROS,
JOHN R. ENGSTROM, & EDMUND A. BARBER JR.
BY Robert S. Dunham
ATTORNEY

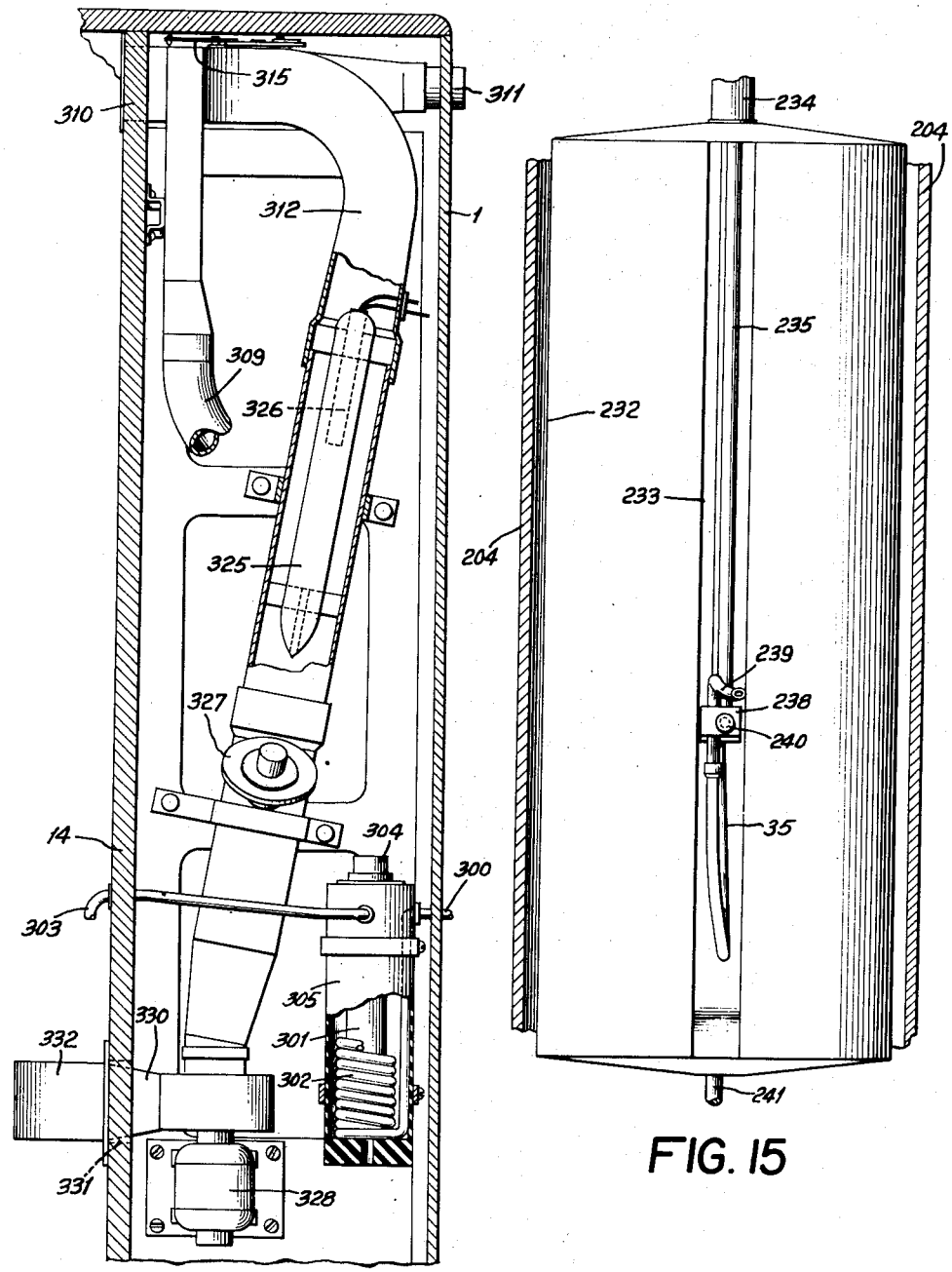

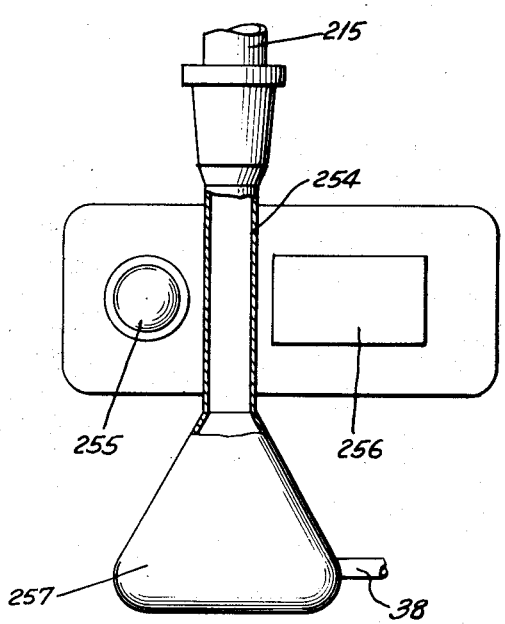
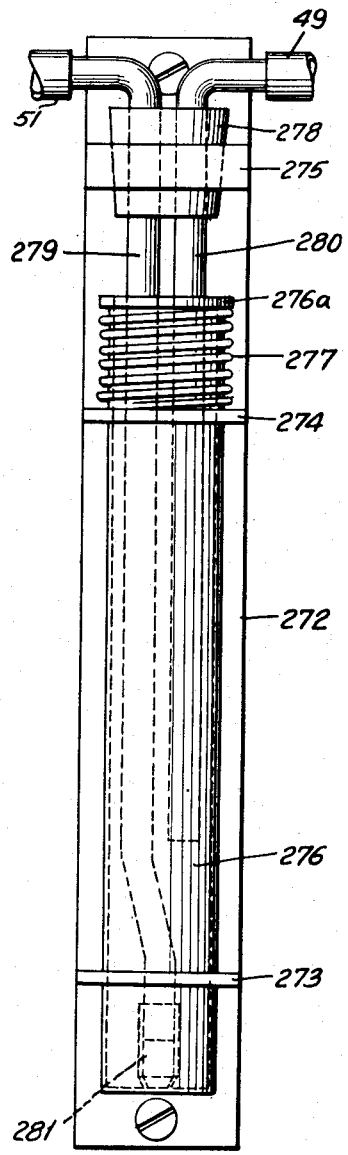

Nov. 17, 1953 J. H. GIBBON, JR., ET AL 2,659,368
EXTRACORPOREAL CIRCULATION DEVICE
Filed May 28, 1949 16 Sheets-Sheet 12

INVENTORS
JOHN H. GIBBON Jr., GUSTAV V.A. MALMROS,
JOHN R. ENGSTROM, & EDMUND A. BARBER Jr.
BY Robert S. Dunham
ATTORNEY Nov. 17, 1953  J. H. GIBBON, JR., ET AL  2,659,368
EXTRACORPOREAL CIRCULATION DEVICE
Filed May 28, 1949  16 Sheets-Sheet 13

INVENTORS
JOHN H. GIBBON JR., GUSTAV V. A. MALMROS
JOHN R. ENGSTROM, & EDMUND A. BARBER JR.
BY
Robert S. Dunham
ATTORNEY

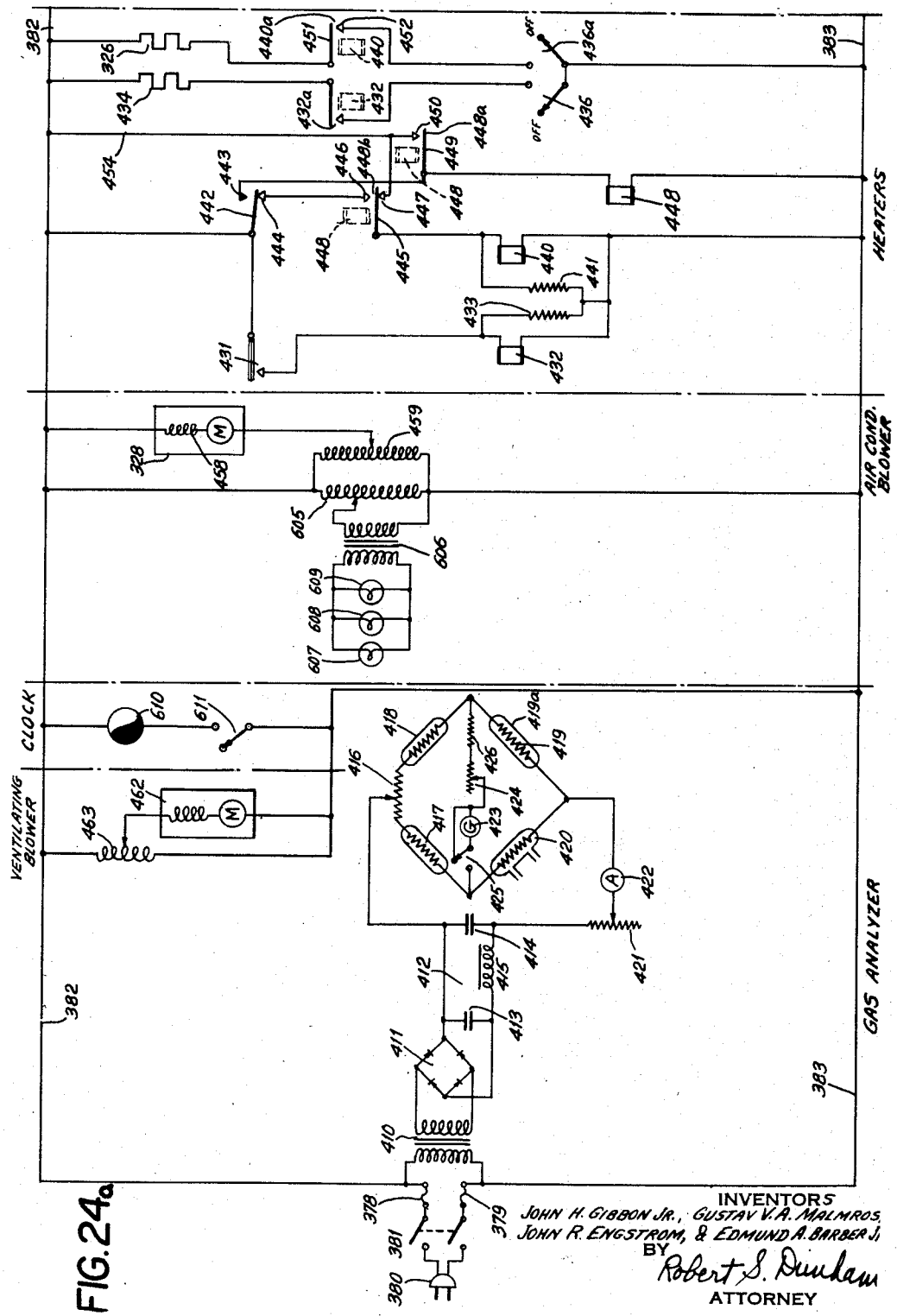

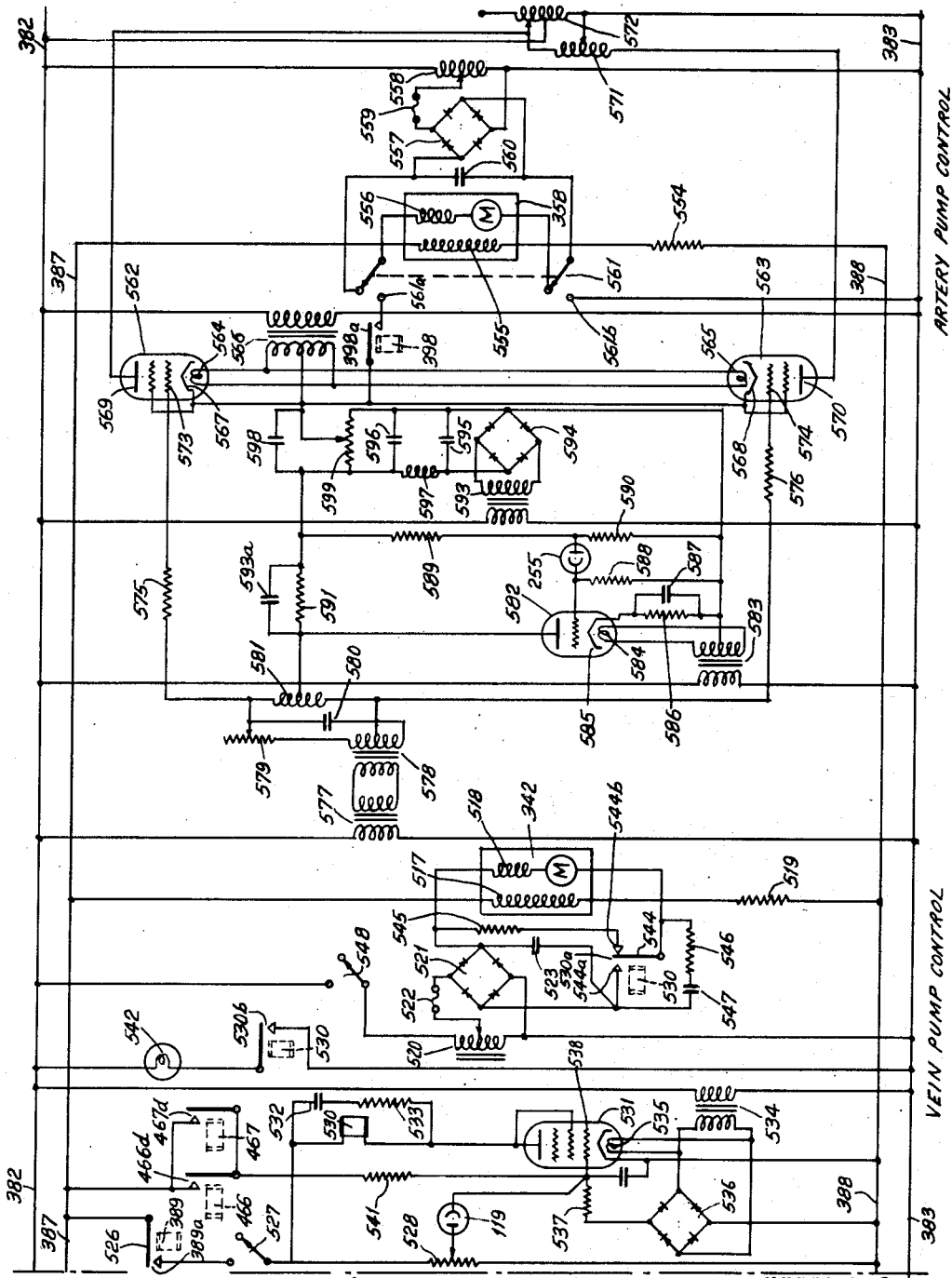

Patented Nov. 17, 1953

2,659,368

UNITED STATES PATENT OFFICE 2,659,368

EXTRACORPOREAL CIRCULATION DEVICE

John H. Gibbon, Jr., Philadelphia, Pa., Gustav V. A. Malmros, Binghamton, John R. Engstrom, Endicott, and Edmund A. Barber, Jr., Johnson City, N. Y., assignors to The Jefferson Medical College of Philadelphia, Philadelphia, Pa., a nonprofit corporation of Pennsylvania Application May 28, 1949, Serial No. 96,114

21 Claims. (Cl. 128—214)

This invention relates to an extracorporeal circulation device and particularly to an improved mechanical device for temporarily assuming the functions of the heart and lungs in a human being or animal.

The great advances made in thoracic surgery in recent years have been accompanied by progress in surgery of the heart. The repair of heart wounds and operations upon the heart are being accomplished with an increasingly lower mortality rate. However, attempts to carry out surgical procedures within the cardiac chambers or great vessels at the base of the heart are extremely delicate and difficult and have not been attended, as yet, with great certainty and success. In many operations on the heart or its associated vessels, the surgeon operates against a very restricted time schedule. This factor, coupled with the delicate and highly difficult operative procedure, renders cardiac surgery a difficult undertaking.

Operative procedures upon the heart and its associated vessels could be better performed if the heart was temporarily relieved of its function of pumping blood. If surgical operative procedures are necessary while the heart is pumping blood, the vigorous expansions and contractions of the pulsating member render delicate surgical procedures extremely difficult, if not in many cases practically impossible. Relieving the heart of its normal function of pumping blood, if only for a short period of time, would, of course, relieve many of the attendant surgical operative difficulties. However, in order to maintain life during a temporary cessation of blood flow for an appreciable time, it is necessary to assume the cardiorespiratory functions of the subject by some other means to maintain a life sustaining flow of blood within the subject's circulatory system.

In addition, if only a portion of the cardiorespiratory functions were temporarily assumed, many of the difficulties attendant on cardiac surgery could be reduced.

In general, the concept of extracorporeal circulation devices is old in the art. This invention may generally be described as an improved extracorporeal circulation device to temporarily assume or assist the functions of the heart and lungs in a human being or animal. In this invention there are included novel elements not found in prior devices of this type and improvements in many of the elements found in the prior art devices.

In the temporary replacement of the heart and lungs by an extracorporeal circulation device, it is desirable that the device approach, if not attain, an equivalent functional replacement of these organs.

In providing a functional replacement for the heart, it is desirable to include a separate pumping system for both the venous blood circulatory system and the arterial blood circulatory system. This invention includes improved pumping systems which provide the requisite pumping of the blood with a minimum of hemolysis. In addition, the pumping systems are provided with an improved system of controls capable of automatic or manual operation, which provide a sensitive or accurate control of the rate of blood flow through the device and which prevent the introduction of air into the subject's arterial blood system.

In providing a functional replacement for the lungs of the subject, it is necessary to introduce oxygen into the venous blood. This invention includes an improved oxygenating device, capable of introducing variable controlled amounts of oxygen into the blood with a minimum of hemolysis and frothing.

In providing a functional replacement for the heart and lungs, it is desirable to control the temperature of the blood flowing in the extracorporeal circulation device, as deviations from normal body temperatures might result in serious shock and injury to the subject. This invention includes a sensitive automatic temperature control system to assure a coincidence of the body temperature of the subject and the operating temperatures in the extracorporeal circulation device.

In the obtaining of a supply of venous blood from the subject's circulatory system, it is necessary to enter and draw blood from at least one of the subject's veins. The amount of venous blood that can be supplied to the oxygenator depends in part on the size of the vein from which the supply is taken. In the event that this vein cannot supply the requisite amount of blood as required by the venous pumping system, the vein, being a resilient member, will occlude and thus prevent the passage of blood. The vein will normally remain occluded until the demand made by the pumping system is relieved, at which time the pressure of the blood in the vein will open the occlusion. This invention includes an automatic control sensitive to venous occlusion, which automatically stops the venous pumping system and permits the resumption of pumping only when the occlusion is relieved.

In addition, the extracorporeal circulation device includes an automatic blood proportioning device which permits the obtaining of the venous blood from a plurality of the subject's veins. This proportioning device is also sensitive to venous occlusion and will automatically adjust the rates of flow through the respective veins to prevent or reduce any occlusions.

The invention also includes an integral continual blood analysis system whereby the oxygen content of the venous blood and the oxygen content of the arterial blood are continually indicated and compared. The invention also provides a system of automatic controls for regulating the temperature, rates of flow and rates of introducing oxygen into the blood. In addition, there are provided visual indications of the conditions existent in the extracorporeal circulation device at all times.

The invention also includes improved means for eliminating surging or pulsing of the blood disposed within the extracorporeal circulation device.

The invention may be summarized as an improved extracorporeal circulation device embodying new and novel elements and also embodying improvements on various elements found in circulation devices of this type existent in the prior art. The primary object of this invention is the provision of an improved extracorporeal circulation device.

Another object of this invention is the provision of an improved system of automatic temperature controls for an extracorporeal circulation device.

Another object is the provision of improved pumping systems and associated control systems to automatically regulate the rate of blood flow through the device.

Another object of the invention is the provision of an improved assembly for introducing oxygen into venous blood.

Another object of this invention is the provision of an automatic blood proportioning device to permit the utilization of a plurality of subject's veins and to automatically respond to an occlusion of any of the same.

Another object of this invention is the provision of on improved control system sensitive to venous occlusion.

Still another object of this invention is the provision of the continually operating blood analysis system to provide a visual indication at all times of the oxygen percentages of the blood contained within the extracorporeal circulation device.

A further object of the invention is the provision of an improved means for eliminating surging and pulsations of the blood flowing in the extracorporeal circulation device.

A further object is the provision of an improved extracorporeal circulation device that may be disassembled and assembled with ease to permit the necessary sterilization and cleaning of the device before and after use.

Referring to the drawings:

Fig. 4 is an oblique view of the blood proportioning device;

Fig. 5 is a plan view of the device shown in Fig. 4;

Fig. 6 is a view partially in section on the line 6—6 of Fig. 5;

Fig. 7 is an enlarged sectional view of the mercury manometer control;

Fig. 8 is a side view of the vein pump control;

Fig. 9 is an exploded perspective view of a partial cuvette cell assembly;

Fig. 9A is a side view of an assembled cuvette cell;

Fig. 9B is a section on the line 9B—9B of Fig. 9A;

Fig. 10 is an oblique view of the improved pump used in the device;

Fig. 11 is a side view, partially in section, of the presently preferred form of pulsation eliminator;

Fig. 12 is a side sectional view of the oxygenating device;

Fig. 13 is a side view partially in section of a preferred form of locking clamp;

Fig. 15 is a side view, partially in section, of the oxygenating device;

Fig. 16 is a side view of the artery pump control;

Fig. 17 is a sectional view of the pulsator on the line 17—17 of Fig. 3;

Fig. 18 is a front view of the presently preferred form of gravity valve;

Fig. 21 is a side view, partially in section, of the air duct assembly;

Fig. 22 is a plan view of the proportioning assembly included in the air duct assembly;

Fig. 23 is a perspective view of the clamping members utilized in the device;

Figure 25:
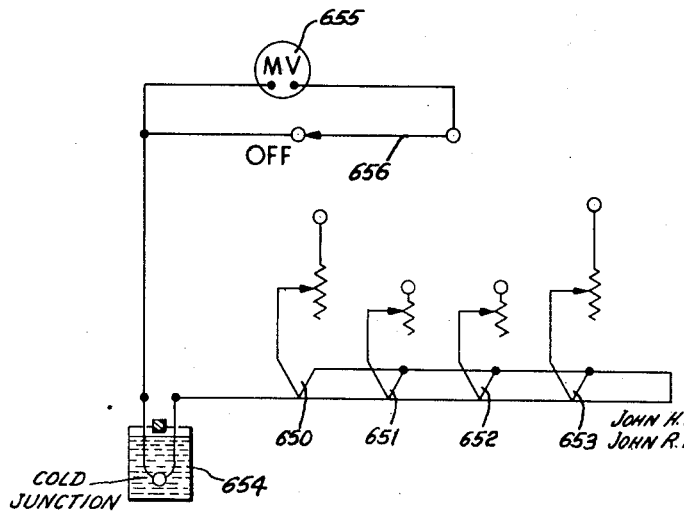
Figure 24B:
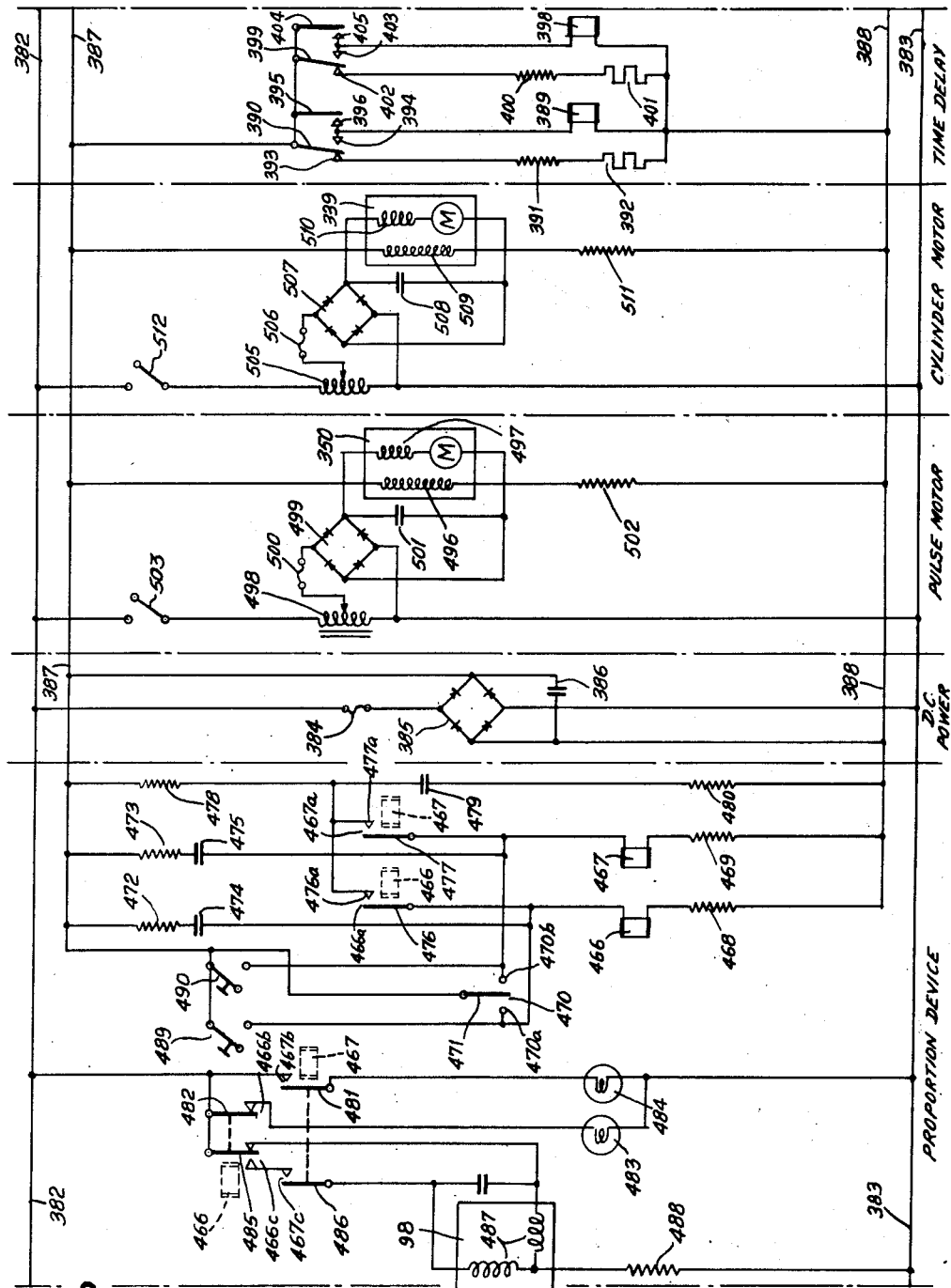

Figs. 24a, 24b, and 24c are the circuit diagrams for the control mechanisms; and Fig. 25 is a circuit diagram for the temperature indicating system.

The extracorporeal circulation device may be considered as consisting of two main assemblies: First, an oxygenator assembly, including (A) the blood circulation components, (B) the gas supply components, (C) a temperature control system, and (D) the motor and associated drive components; second, the power, indicator, and control assembly, including the electrical components relating to the control and indicating mechanisms. A more detailed outline of the components making up the power, indicator, and control assembly will be given at a later point.

For the purposes of simplicity and clarity of explanation, the oxygenator assembly and the components set forth in the subdivisions above will first be considered in detail.

Figure 1:
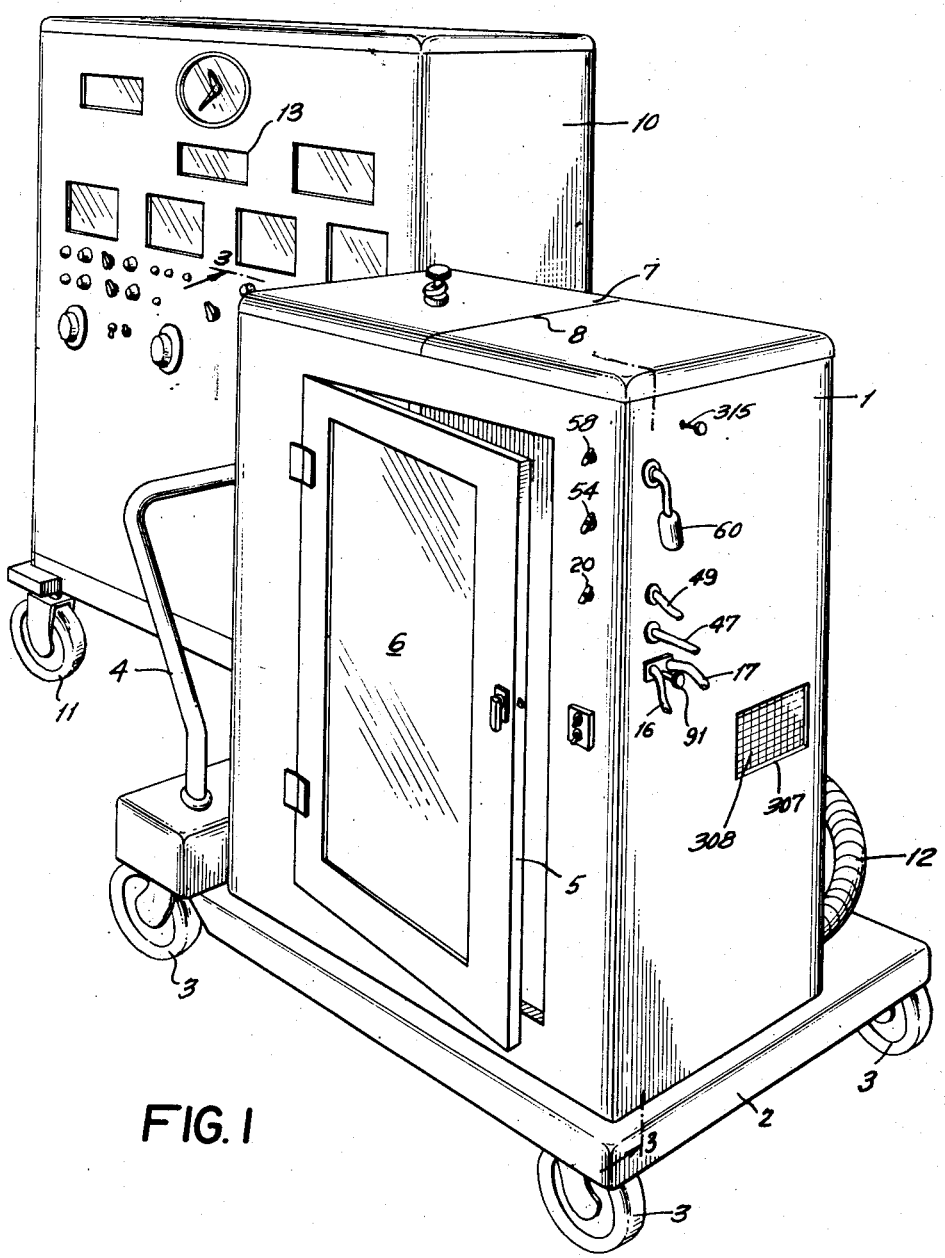
Fig. 1 is an external oblique view of the power, indicator, and control cabinet and the oxygenator assembly cabinet.

Fig. 1 shows the complete assembled extracorporeal circulation device as it would be used in a hospital or laboratory. The oxygenator assembly is contained within the oxygenator assembly cabinet 1, which rests upon and is supported by a carriage 2. The cabinet 1 and carriage 2 are preferably constructed of aluminum or stainless steel or other suitable material that may undergo sterilization processes without corrosion or surface deterioration. The carriage 2 is provided with wheels, such as 3, and a hand rail 4, for facilitating the movement of the oxygenator assembly from place to place. The entire cabinet 1, with the exception of an internal compartment containing the motor and associated drive components, which will be described in detail at a later point, and a portion of the door 5, is insulated by a layer of glass wool or other suitable insulating material, to keep to a minimum the heat lost through the walls. The portion of the door 5, not insulated by the glass wool, has a large double glass window 6, which provides suitable insulating qualities while permitting maximum visibility into the front of the cabinet 1. The cabinet 1 includes a removable top cover 7, hinged at the center, as at 8, to facilitate disassembly of the oxygenator assembly device.

The power, indicator, and control assembly is largely contained within a second cabinet 10, also mounted on wheels, such as 11, for ease of movement from place to place. The oxygenator assembly cabinet 1 and the power, indicator, and control cabinet 10 are electrically connected through a shielded cable 12, which contains the leads interconnecting the electrical circuits contained in both cabinets. The power, indicator, and control cabinet 10 and its contents will be described in detail at a later point.

I. THE OXYGENATOR ASSEMBLY

(A) *Blood circulation components*

(a) GENERAL—MAIN CIRCULATORY SYSTEM

The blood circulation components of the oxygenator assembly are adapted to provide a temporary functional equivalent for the cardio-respiratory system in a human being or animal. These components are represented schematically in the block diagram of Fig. 2, and are shown as mounted on a mounting panel 14 in the oxygenator assembly cabinet 1 in Fig. 3.

Figure 2:
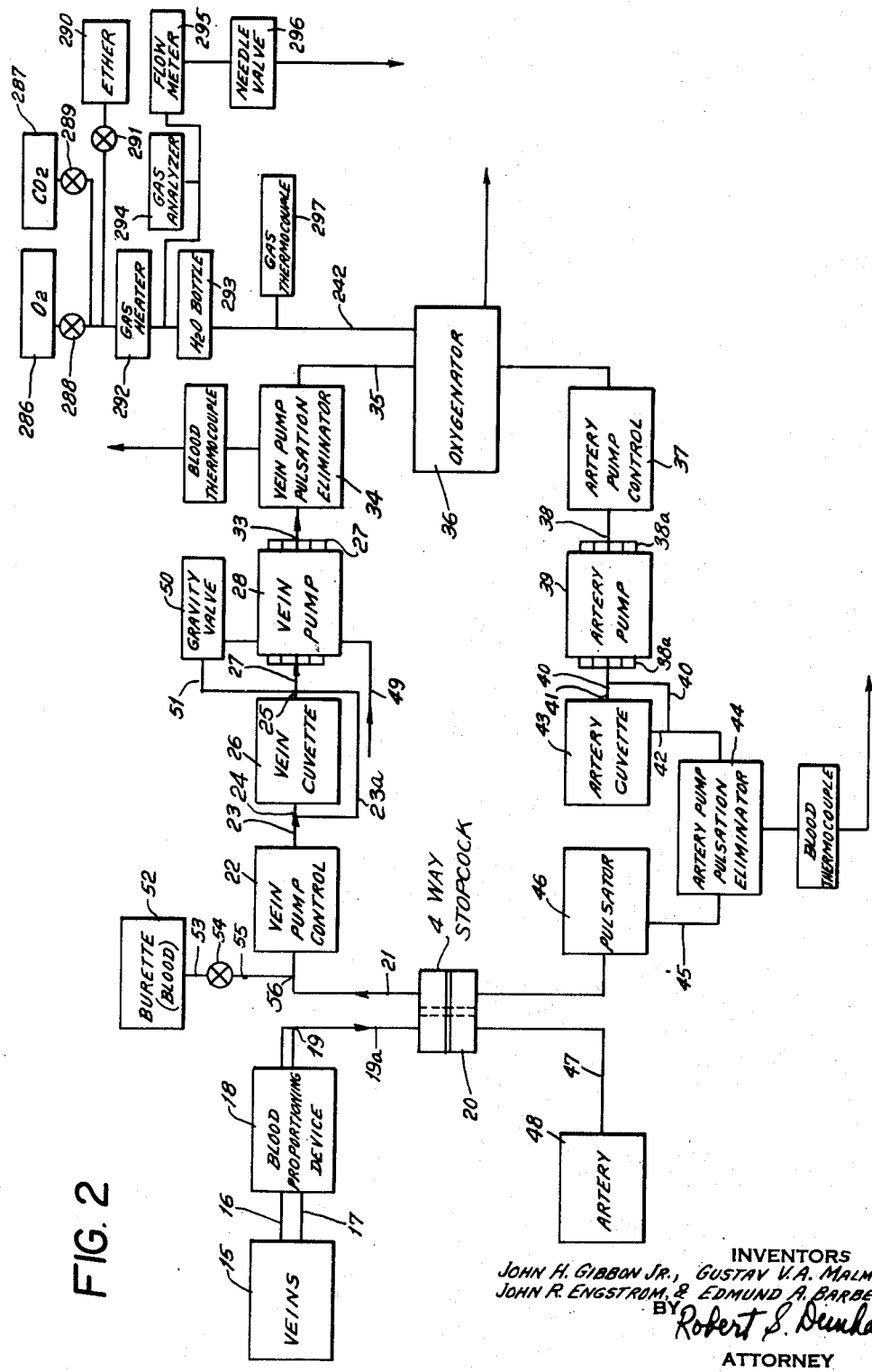
Fig. 2 is a schematic block diagram showing the relationship between the various components contained within the oxygenator assembly cabinet.

Venous blood from the venous branches of the subject's circulatory system, represented schematically at 15 on Fig. 2, is introduced into the oxygenator assembly via the external vein tubes 16 and 17. Provision has been included for obtaining a blood supply from a plurality of the subject's veins utilizing two external vein tubes. However, a single external vein tube may be utilized if a sufficient supply of venous blood is obtainable from a single vein without occlusion. If a plurality of the subject's veins are utilized as a source of supply, the external vein tubes 16 and 17 introduce the venous blood into the blood proportioning device 18. The blood proportioning device 17 regulates the flow of blood through the vein tubes 16 and 17. The proportioning device 18 responds to occlusion or partial occlusion of either of the veins to which the external vein tubes 16 and 17 are attached and automatically adjusts the rates of flow so as to relieve the occlusion. If a single vein is utilized to supply the venous blood, the proportioning device 18 may be bypassed. After leaving the blood proportioning device 18, assuming two of the subject's veins are utilized as a source of venous blood, the dual venous blood paths are joined, as by a suitable T-type connector, such as 19, to a single tube 19a. The tube 19a is joined to one arm of a 4-way directional flow valve, such as the 4-way stopcock 20. The 4-way stopcock 20 is included to provide a simple manual control whereby a closed internal circulatory system (see Fig. 2) may be established within the oxygenator assembly cabinet 1 to obtain the desired operating temperature equilibrium or balance when preparing the extracorporeal circulation device for operational use.

The entering venous blood, after leaving the stopcock 20, is then drawn via the tube 21 to the vein pump control assembly 22 wherein the venous blood supply controls the starting and stopping of the vein pump 28. The venous blood is drawn from the vein pump control assembly 22 via the tube 23. A portion of the venous blood flowing in the tube 23 is bypassed via the tube 24 through the vein cuvette assembly 26 and returned to the venous blood stream flowing in the tube 23a via the tube 25. The vein cuvette assembly 26 provides a continual analysis of the oxygen content of the flowing venous blood.

The main venous blood stream is then passed via a plurality of tubes, such as the tubes 27, through the vein pump 28. The vein pump 28 draws the venous blood from the subject's vein or veins and moves it through the venous portions of the blood circulation components of the oxygenator assembly. On the exit side of the vein pump 28 the plurality of tubes, such as the tubes 27, return the venous blood to a single tube 33, which leads to the vein pump pulsation eliminator assembly 34, wherein the pulsations introduced into the flowing venous blood by the vein pump 28 are removed. The venous blood leaves the vein pump pulsation eliminator 34 via the tube 35, which introduces the venous blood into the oxygenating device, generally designated in Figs. 2 and 3, as 36. The oxygenating device 36 replenishes the oxygen content of the venous blood, and may be considered as the lungs of the extra-corporeal circulation device.

After passage through the oxygenating device 36, the oxygenated blood, which will now be designated as arterial blood, is collected in the artery pump control assembly, generally designated as 37 in Fig. 2. The artery pump control assembly controls the pumping rate and the rates of blood flow in the arterial portions of the extra-corporeal circulation device. The arterial blood is drawn from the artery pump control assembly 37 via the tube 38. The tube 38 is joined to a plurality of tubes, such as the tubes 38a, and the blood flowing therein is passed through the artery pump 39. The artery pump supplies the motive power for the passage of the oxygenated blood in the arterial portion of the oxygenating assembly. The plurality of tubes 38a are joined to a single tube 40 on the exit side of the artery pump 39.

A portion of the blood flowing in the tube 40 is bypassed via the tube 41 through the artery cuvette assembly 43 and returned to the arterial blood stream flowing in the tube 40 via the tube 42. The artery cuvette assembly 43 provides a continual analysis of the oxygen content of the flowing arterial blood. The vein and artery cuvette assemblies cooperate in providing an indication of the continual efficiency and operation of the oxygenating device 36. The tube 40 introduces the arterial blood into the artery pump pulsation eliminator assembly 44 wherein the pulsations introduced by the artery pump 39 are eliminated. The arterial blood leaves the artery pump pulsation eliminator assembly 44 via the tube 45. The arterial blood flowing in the tube 45 is subjected to the action of the pulsator assembly 46, wherein a measured controlled pulsation is introduced into the flowing arterial blood. The pulsating arterial blood then enters the 4-way stopcock 20 and leaves the oxygenator assembly cabinet 1 on its return to the subject's arterial system, schematically represented at 43 on Fig. 2, via the external artery tube 47.

To remove blood from the coronary system, which normally collects at the heart, there is provided a separate pumping system. One of the tubes 49 of the vein pump 28 is brought out where it is available to draw this blood away periodically. The blood is drawn from the source through the tube 49 by the vein pump 28. After passing through the vein pump 28, this blood is introduced into the gravity valve assembly 50. The blood leaves the gravity valve assembly 50 and is introduced into the main venous circulatory system via the tube 51.

In operational procedures it is necessary to have the oxygenating assembly cabinet 1 and its contents reach a temperature equilibrium or balance before operational use. To provide a closed internal circulatory system and to provide a means of supplying the apparatus with donor blood prior and/or during operational procedures, there is provided a blood receptacle or burette 52. This burette 52 is connected to the tube 21, which contains the main flow of venous blood, by a tube 53, a stopcock 54, a tube 55, and a suitable connecting element, such as the T-tube 56. The burette 52 serves as a reservoir to supply bood as needed to the oxygenator assembly system and to act as an equalization chamber during preliminary use, while utilizing a closed internal circulatory system, to take up any differential between the pumping rates of the vein pump 28 and the artery pump 39.

The 4-way stopcock 20 provides a control of the paths of blood flow in the two circuits. During operations prior to actual use such as attaining a temperature equilibrium for the entire unit, one path through the stopcock is used to join the tube 45, in output portions of the arterial system, to the tube 21, in the input portions of venous system, to provide a closed internal circulatory system within the unit wherein the blood is cycled through the venous system, through the oxygenator and through the arterial system and is then directly reintroduced into the venous system for further recycling. The other path, in this position, connects the vein tube 19a to the external artery tube 47 and neither of these tubes will be in use during the preliminary operations. In the operational or actual use position, which may be attained by turning the stopcock 20 a quarter turn from the preliminary use position, the vein tube 19a is connected to the vein tube 21 and the tube 45 is connected to the external artery tube 47.

Also included in the blood circulation components is a control whereby the level of the blood in the vein pump control assembly 22 may be manually adjusted. This control (see Fig. 3) comprises the tube 57, a three-way stopcock 58 having one passage open to the atmosphere, a tube 59 and an external compressible stiff-walled bulb 60 having but one opening. The stopcock 58 in its normal position connects the compressible bulb 60 to the air in the cabinet and seals off the air above the blood in the vein pump control assembly 22. If it is necessary to raise the blood level in the vein pump control assembly 22, air is exhausted from the bulb 60 into the cabinet. The stopcock 58 is then turned to connect the bulb 60 to the air in the vein pump control assembly 22 and the bulb is released, thus drawing air from said assembly, and in so decreasing the pressure, permitting a rise in the blood level. It also provides a means whereby the blood level may be reduced by just exhausting air from the bulb 60 into the vein pump control assembly 22 and then returning the stopcock 58 to its normal position.

The tubing utilized in the blood circulation components may be silicone rubber, glass or other suitable material that may withstand the sterilization processes.

We will now consider the components included in the blood circulation system individually and in detail.

(b) BLOOD PROPORTIONING DEVICE

The presently preferred embodiment of the blood proportioning device 18 (see Figs. 2 and 3) is shown in detail in Figs. 4, 5, 6 and 7.

The blood proportioning device 18 is included in the blood circulation components to permit the taking of blood from two of the subject's veins at the same time. In some instances a sufficient amount of blood may be obtained from a single vein. However, a greater supply of venous blood may be obtained if two of the subject's veins are utilized. When two veins are utilized it is likely that one of the veins may be unable to supply blood as rapidly as demanded, while the other is able to do so without difficulty. If a vein cannot supply the blood demanded by the extracorporeal circulation device, the vein will occlude and little or no venous blood will flow. The proportioning device continually checks the pressures in the external vein tubes 16 and 17 and automatically reacts to any pressure unbalance between the tubes by compressing the tube having the lower pressure therein to reduce the flow of blood therethrough in order to rebalance the pressures.

The device is mounted upon a base plate 66 and a front plate 67 which is disposed perpendicularly to one edge of the base plate 66. The external vein tubes 16 and 17 carrying the venous blood from the subject's veins enter the oxygenator assembly cabinet 1 through the collars 68 and 69, which may be of rubber or other suitable material and are mounted in the side wall of the oxygenator assembly cabinet 1. The external vein tubes 16, 17 are secured to the inlet tubes 70, 71 of the pressure difference gauge section of the proportioning device. The pressure difference gauge comprises a lower block 72 clamped in alignment to a similarly sized upper block 73 and separated from said upper block 73 by a resilient diaphragm 74, such as a suitable rubber diaphragm. The upper block 73 has two internal pressure chambers 75 and 76 embedded therein. Coaxially disposed in the lower block 72 are two correspondingly shaped pressure chambers 77 and 78. The pressure chambers in the upper and lower blocks 73 and 72, respectively, are separated by the resilient diaphragm 74. The inlet tubes 70 and 71 open into the pressure chambers 75 and 76 in the upper block 73, as shown clearly in Fig. 6. Connected to the opposite sides of the pressure chambers 75 and 76 are the outlet tubes 79 and 80. Thus there are provided separate parallel paths for the flow of venous blood, one path being through the inlet tube 70, the pressure chamber 75 and the outlet tube 79, and the other being through the inlet tube 71, the pressure chamber 76 and the outlet tube 80.

The pressure chambers 77 and 78 in the lower block 72 are connected to the tubes 81 and 82.

The tubes 81 and 82 are joined to the arms of a glass U-tube manometer 83. The manometer 83 is partially filled with mercury as at 84 in Fig. 7. Disposed in each arm and at the base of the manometer 83 are electrodes 85, 86 and 87. The resilient diaphragm 74 serves as a barrier between the venous blood in the pressure chambers 75 and 76 in the upper block 73 and the air and mercury system in the pressure chambers 77 and 78 and the manometer 83, but does not interfere with the transmission of pressure to the manometer. The electrodes 85, 86 and 87 electrically detect the rise of the mercury in either arm of the manometer when the pressures become unbalanced.

To provide for an initial equalization of pressures, the pressure chambers 77 and 78 are tapped by the small holes 88 and 89 bored in parallel arrangement through the lower block 72. These two holes are externally sealed by a rubber washer 90 clamped against the lower block 72 by the elongated thumbscrew 91. The mercury 84 in the manometer 83 may be initially brought into balance by loosening the thumbscrew 91 to permit atmospheric pressure to act upon the manometer 83 and the diaphragm 74 and then retightening it. Any change in pressures after the thumbscrew 91 is retightened is reflected in a resulting unbalance of the mercury level.

The venous blood leaves the pressure difference gauge section of the blood proportioning device through the outlet tubes 79 and 80 and enters the flexible tubing 92 and 93, which may be suitable rubber tubing. The flexible tubes 92 and 93 enter the flow ratio adjusting system through the positioning clamp 94. The positioning clamp 94, together with the second positioning clamp 95 and the annular plate 100, maintain the tubes 92 and 93 in parallel array through the flow ratio adjusting system. Disposed between the tubes 92 and 93, intermediate the positioning clamps 94 and 95, is an eccentric 96 secured to the shaft 97 of the flow ratio adjusting motor 98. The angular position of the eccentric 96 is indicated by a pointer, such as 99, mounted on the shaft 97.

Each of the tubes 92 and 93 carrying the venous blood is compressed by the eccentric 96 against an adjustable anvil, such as 101 and 102, the amount of compression varying, once the anvils have been adjusted and secured in position, according to the angular position of the eccentric 96. The anvils 101 and 102 may be suitably formed by bolts with large, smooth, flat heads and having knurled edges 103 for easy manual adjustment and positioning. The anvils 101 and 102 are locked in position by the knurled nuts 104, 105, respectively. The eccentric 96 may also be positioned by manually operating switches 489, 490 (see Fig. 24b) which may be conveniently mounted on the front panel 13 of the power, indicator and control assembly cabinet 10, and control the application of power to the flow ratio adjusting motor 98. These switches are used to control the rotation of the eccentric 96 during the initial manual positioning of the anvils 101, 102, since it is desired that when the eccentric 96 is turned to each of its extreme limiting positions, the tube on the corresponding compressed side be completely closed. If the flow resistance of both the tubes 92 and 93 are not equal, one of the anvils 101, 102 may be backed away slightly until the eccentric 96 automatically takes its proper setting.

The electrical circuits for the flow ratio adjusting motor 98 and the control circuits relating thereto will be described at a later point in this specification.

Also mounted on the front plate 67 is a male connector 108, which provides a convenient electrical connection for the electrical leads for the manually operable switches relating to the blood proportioning device.

After passing through the flow ratio adjusting system, the flexible tubes 92 and 93 are perpendicularly disposed adjacent to the periphery of the base plate 66 and supported in parallel array by the clamps 106 and 107. The two flexible tubes 92 and 93 are brought to a junction by the T-tube 19 approximately 2½ feet past the eccentric 96. A junction much closer than 2½ feet is avoided in order to prevent the pressure in one of the tubes as checked at the pressure difference gauge from affecting the pressure in the other tube at the gauge. From the junction i. e. the T-tube 19 the venous blood is carried directly to the 4-way stopcock 20 via tube 19a (see Figs. 2 and 3).

(c) THE VEIN PUMP CONTROL ASSEMBLY

Figure 3:
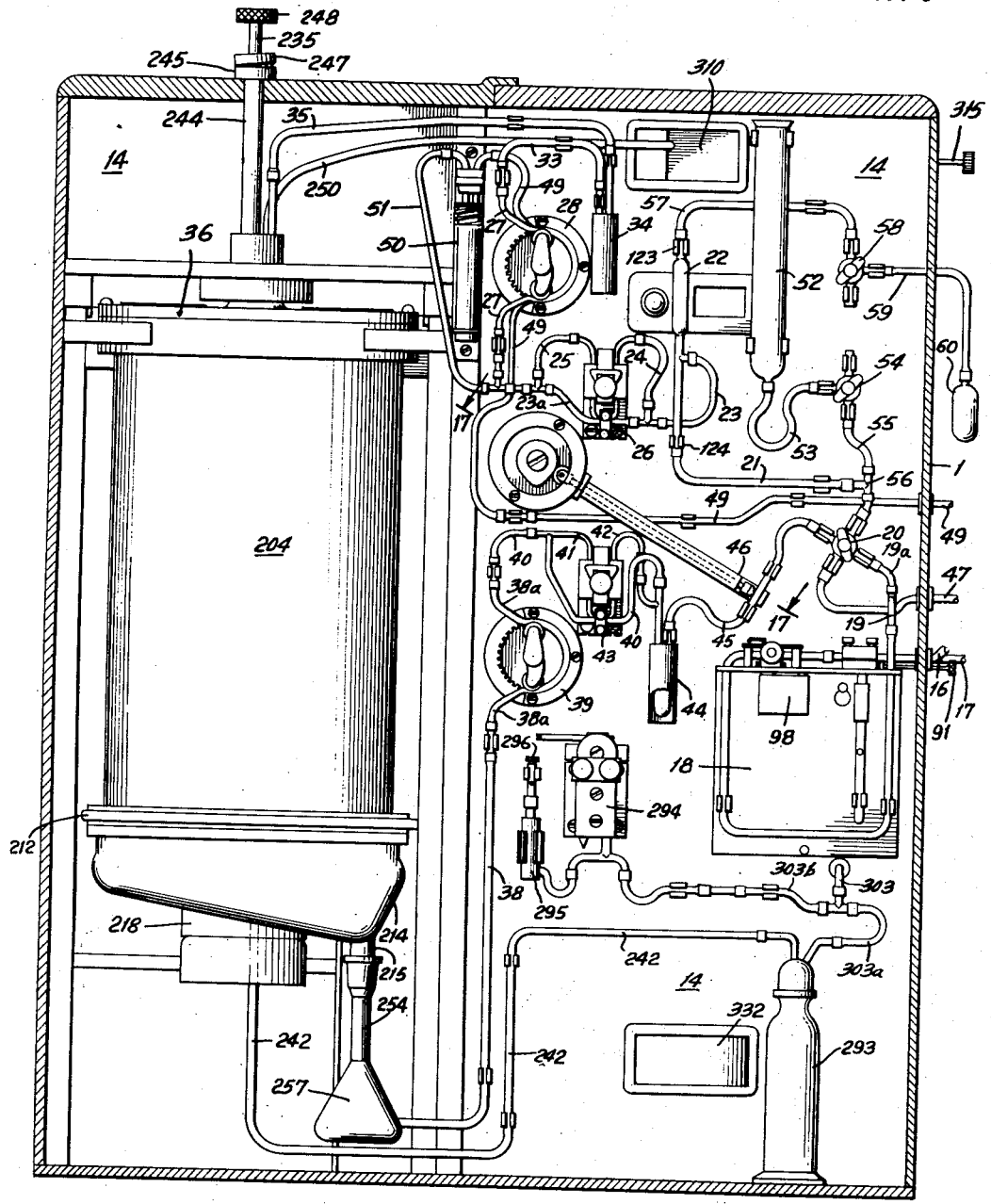
Fig. 3 is a front view in section of the oxygenator assembly cabinet on the line 3—3 of Fig. 1.
Figure 14:
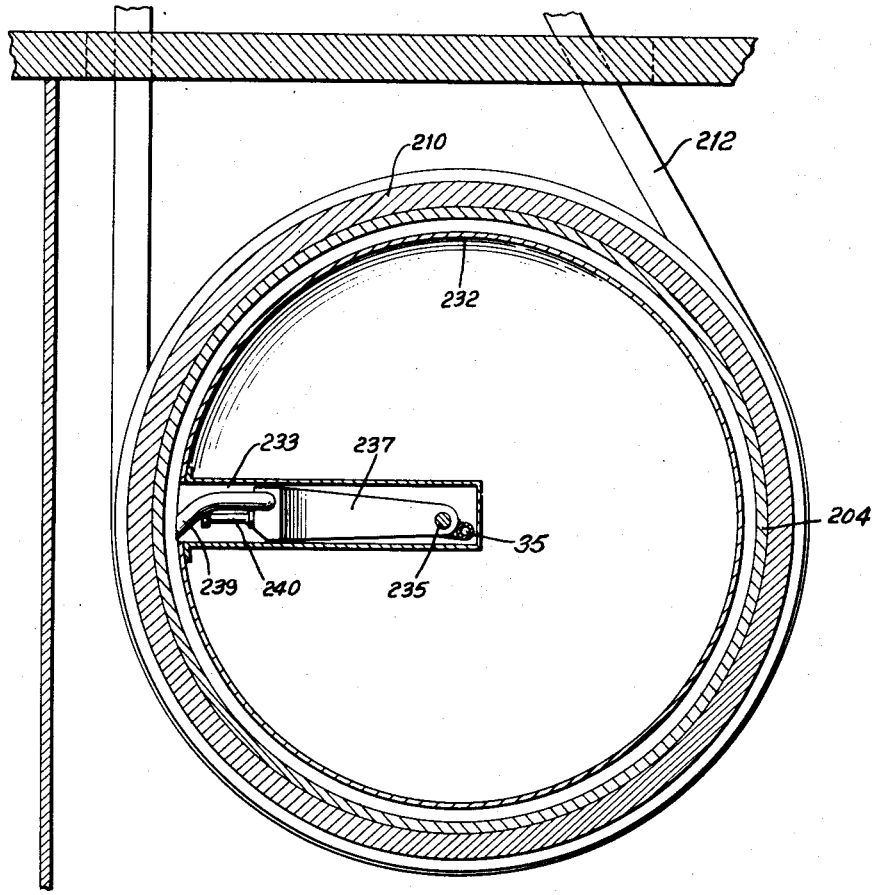
Fig. 14 is a section on the line 14—14 of Fig. 12.

The vein pump control assembly illustrated at 22 in Figs. 2 and 3 is shown in detail in Fig. 8. An essential element of the vein pump control assembly is a specially shaped glass T-tube 115. The venous blood normally enters via the lower branch 116 and leaves via the side branch 117. The flow of blood into the upper branch 118 is oscillatory in nature due to the pulsations introduced by the vein pump 28 (see Fig. 3). This oscillatory action is desirable because the blood in the upper branch 118 is thus kept from becoming stagnant. This action is utilized to the maximum advantage by the design of the T-tube 115, in which the blood flowing from the lower branch 116 is directed towards the upper branch 118 and is made to react upon it while being turned through a right angle into the side branch 117. The diameter of the upper branch 118 is made larger than the diameter of the lower and side branches 116 and 117, respectively, in order to minimize the change in blood level caused by the pulsations introduced by the vein pump. The larger diameter for the upper branch 118 also provides a reservoir to hold sufficient blood to assure that the blood level will not descend too precipitously when a vein occludes, thus giving the vein pump 28 sufficient time to come to a complete stop before air is drawn into the venous blood circuit through the side branch 117.

The enlarged upper branch 118 is maintained partially filled with blood. The space above the blood contains air and is normally sealed off by the tube 57 leading to the blood level adjusting stopcock 58 (see Fig. 3). As described above, the stopcock 58 provides a means for adjusting and maintaining the blood level in the vein pump control tube 115.

The vein pump control tube 115 and the associated tubing connected thereto is supported in a vertical position by the clamps 123 and 124 (see Fig. 3). Disposed on the mounting panel 14 is a plate 120, having perpendicularly mounted thereon a photo cell 119. The plate 120 contains a rectangular aperture 121 having a glass lens 122 mounted therein. A light source, not shown on Fig. 8, is disposed behind the mounting panel 14 and positioned to transmit a beam of light through the aperture 121, and through the upper branch 118 of the glass T-tube 115 into the photo cell 119.

The electrical components of the vein pump control assembly 22 will be described in detail at a later point in this specification. However, a general description will be presented at this point to facilitate an understanding of the function and construction of the vein pump control assembly 22. If the level of blood in the upper branch 118 of the glass T-tube 115, separating the photo cell 119 and the light source, falls, it indicates that the supply of blood being drawn from the subject's veins does not meet the demands of the vein pump. This normally results in an occlusion of the supply vein. When the vein occludes, no blood will flow at all. When this happens, the vein pump 28 should stop immediately to allow the occlusion to break open. Electrical circuits responsive to the photo cell 119 have been included to insure a quick stoppage of the vein pump 23. Thus, as the level of blood falls, the photo cell 119 sees light and it starts to conduct current. This increase in current flow is used to trigger an electrical control circuit which quickly stops the vein pump 28. The preferred electrical control circuit will be described in detail at a later point.

(d) THE CUVETTE CELL ASSEMBLIES

The function of the cuvette cell assemblies is to provide a means for determining the relative amount of oxygen in the blood. Since the blood in the vein circuit requires oxygen, the blood passing through the vein cuvette cell 26 (see Figs. 2 and 3) appears somewhat blue. Similarly, the blood in the arterial circuit passing through the artery cuvette cell 43 (see Figs. 2 and 3), having received oxygen, appears reddish in color.

The artery cuvette cell 43 and the venous cuvette cell 26 are identical in construction, and the presently preferred embodiment of the device illustrated in Figs. 9, 9A and 9B is to be considered representative of both the cuvette cells in the extracorporeal circulation device.

In general, the cuvette cell is constructed so that a portion of the venous blood is made to flow in a narrow space between two flat discs of optical quality glass. The pieces of glass are separated by a specially contoured silicone rubber gasket. The glass cell thus formed is held together and against a seat by a cushioned triangular clamp. Electrical apparatus, including a light source and a phototube unit, is then clamped over the glass cell to sense the variation of the color of the blood passing between the glass discs from a standard sample and in such a manner determine the oxygen content of the blood.

Figs. 9, 9A and 9B show in detail the presently preferred embodiment of the cuvette cell. There is provided a rectangular base plate or mounting plate 128, which is secured to the mounting panel 14 in the oxygenator assembly cabinet 1 (see Figs. 1, 2 and 3). Mounted upon the base plate 128 is a lower block 129, which comprises a U-shaped piece of metal having internal passageways 126, 127 longitudinally traversing the arms of the U to provide a passage for the blood entering via inlet tube 130 and leaving via the exit tube 131. The path of the venous blood through the cuvette cell is, in the direction of flow, via the inlet tube 130, the curved section 132 and the outlet tube 131. The passageways 126, 127 are tapped by two perpendicularly disposed tubes 134 and 135, which terminate on the upper surface of the lower block 129. Thus, there is provided a path for the main blood flow through inlet tube 130, the curved tube 132 and the outlet tube 131, and provision has been incorporated to bypass a portion of the blood flowing in the above circuit via the tubes 134 and 135. The surface of the lower block 129 provides a seat for the optical system and the U-shape provides a receptacle, such as 133, into which may be inserted part of the electrical components.

Disposed in coaxial alignment on the upper surface of the lower block 129 is an upper block 136, which is shaped to provide a circular receptacle to peripherally encompass a flat plate 137 of optical quality glass having apertures 139 and 138 included therein. The apertures 138 and 139 in the glass plate 137 are located to coincide with the bypass blood tubes 134 and 135 in the lower block 129 when the glass plate 137 and the upper block 136 are seated in coaxial engagement on the lower block 129.

Superimposed on the glass plate 137 is a silicone rubber gasket 141 having a specially contoured segment, such as 142, removed from its surface. Superimposed on the gasket 141 is a second flat glass plate 143, also of optical quality. The glass plates 137 and 143, together with the interleaving gasket 141, form a flat chamber through which the blood may enter via tube 134 and aperture 138 and leave via aperture 139 and tube 135.

The tube 132 may be a rubber tube and the amount of blood bypassed through the glass cell described above may be proportioned by the clamp on the main circuit. The clamp includes an anvil member 147 disposed beneath the tube 132 and a movable clamping member 144, connected to the anvil 147 by the threaded bolts 145 and 146, disposed above the tube 132. Varying the position of the clamping member 144 by the bolts 145 and 146 varies the pressure on the tube 132, which in turn regulates the amount of blood bypassed through the glass cell.

Fig. 9A is a sectional view of a complete cuvette cell. The glass cell formed by the plates 137 and 143 separated by the gasket 141 is held together and against the seat by a cushioned triangular clamp 150. The upper plate 152 of the clamp 150 is secured in position by the knurled thumbscrew 149 mounted in the overhanging hood 153.

Disposed above the glass cell is a light source contained within a threaded shaft 154, which in turn is mounted on a plate 155. The plate 155 is separated from a photo sensitive unit in the base plate 156 by a separating strut 157. The entire photo tube unit is clamped around the glass cell by means of a nut 151 on the threaded shaft 154. The entire photo tube unit is of standard manufacture and is commercially designated as the earpiece from a Coleman Anoxia Photometer manufactured by Coleman Instruments, Inc. of Maywood, Illinois. The associated electrical circuits, the leads to which are represented by the cable 158 and the plug 159 (see Fig. 9A), are not included in this specification, as no claim of novelty is directed thereto.

The cuvette cell illustrated in the drawings provides an improved assembly, whereby a standard electronic device, such as the earpiece of the Coleman Anoxia Photometer described above, may determine the oxygen content of the blood without interrupting or opening the blood circulation system.

(e) THE BLOOD PUMPS

The venous blood pump 28 and the arterial blood pump 39 (see Figs. 2 and 3), together with the pulsator 46 (see Figs. 2 and 3), may be considered as the "heart" of the extracorporeal circulation device, since they perform the same duties as the heart of the subject. In general, the vein pump draws blood from a vein of the subject and pumps it into the oxygenating device 36, the "lung" of the extracorporeal circulation device. The artery pump draws blood from a reservoir adjacent to the oxygenating device 36 and pumps it back into an artery of the subject. The pulsator 46, which is interposed between the artery pump 39 and the subject, provides a means of introducing a controlled pulsation, simulating that of an actual heart beat, into the arterial blood delivered to the subject.

The blood pump illustrated in Fig. 10 is representative of the presently preferred construction utilized for both the vein pump 28 and the artery pump 39. The pump illustrated in Fig. 10 operates like, and is similar in construction to, the pump described by M. De Bakey in U. S. Patent No. 2,018,998. There is provided a cylindrical mounting member 167, which is disposed adjacent to the mounting panel 14 in the oxygenator assembly cabinet. A circular rack 168 is peripherally disposed on the internal portion of the cylindrical mounting member 167. A drive shaft 169, mechanically linked to a drive system behind the mounting panel 14 (not shown in this Figure 10), is axially disposed, and extends outwardly from, the cylindrical mounting member 167. The drive shaft 169 serves as a mount for bracket members 170 through 173, inclusive, which in turn support two diametrically opposite rollers 174 and 175. The brackets 170 through 173 support the shafts 176 and 177 of the rollers 174 and 175. Secured to the end of the roller 174 adjacent to and engaging the rack 168 is a pinion 178. Secured to the end of the roller 175 adjacent to and engaging the rack 168 is a pinion 179.

Mounted on the cylindrical mounting member 167 are a plurality of clamping members, such as 180 through 183. These clamping members 180 through 183 are arcuate in shape and extend over a distance slightly greater than a semicircle. The clamping members 180 through 183 are held in clamping position by thumbscrews, such as 184, 185 and 186. The clamping members 180 through 183 serve as a mount for the gum rubber tubes, such as 187, 188 and 189, which provide sufficient volume to carry the flow of blood through the pump. Each of the tubes 187 through 189 has a flange, such as 190, which is engaged by the clamping members 180 through 183 and maintains the tubes in internal peripheral engagement with said clamping members.

As the shaft 169 rotates, the rollers 174 or 175 successively compress the tubes 187 through 189 against the clamping members 180 through 183. The area of compression moves along the semicircle with the rotation of the shaft 169, with the result that the blood present in the tubes is propelled in front of each roller. The tubes 187 through 189 regain their circular cross-section after the roller passes and refill with new blood. Since the arcuate portions of the clamps are slightly greater than a semi-circle, the second roller always contacts the tubes 187 through 189 before the first roller leaves and the process repeats itself.

The rate of pumping is controlled electrically by controlling the pump motor speed. The shaft 169 is mechanically geared to the pump motor. The electrical circuits relating to the control of the motor speed and the mechanical gearing between the shaft 169 and the pump motor will be described in detail at a later point.

In order to minimize a scrubbing action on the rubber tubes 187 through 189 by the rollers 174 and 175, the circular rack 168 and pinions 178 and 179 are provided. It is desirable to prevent any scrubbing action, for the scrubbing action results in hemolysis of the blood, a condition which is to be avoided, if possible. The rack and pinion arrangement assures pure rolling action on the tubes and scrubbing or sliding of the rollers on the tubes is eliminated.

To facilitate the disassembly of the pumps for cleaning, sterilization or replacement, there is provided a locking pin 191, which permits the rollers to be moved from their diametrically opposing positions, i. e., permits one roller bracket to be rotated with respect to the other roller bracket. The tubes are readily removed after the displacement of the rollers, as described above, by removing the thumbscrews 184, 185 and 186 and disassembling the complete device.

(f) PULSATION ELIMINATORS

The vein and artery pump pulsation eliminators 34 and 44 (see Figs. 2 and 3) have been included in both the venous and arterial systems of the blood circulation components, in order to remove the pulsations from the output of the vein and artery pumps. As described above, the vein and artery pumps utilize rollers, which introduce pulsations into both the venous and arterial blood circulation systems. If the blood delivered by the vein pump 28 were not free of pulsations, it would flow in spurts and be introduced in an uneven flow into the oxygenating device 36. While the flow of blood in the arterial branches must, of necessity, be of a pulsating character to simulate the natural pulse of the subject, the frequency of the pulsations must be controlled independently of the speed of the artery blood pump 39. Hence, the pulsation eliminators, in both the arterial and venous branches, are included to remove the pulsations introduced by the artery and vein pumps. Both the artery pump pulsation eliminator 34 and the vein pump pulsation eliminator 44 are similar in construction and the pulsation eliminator illustrated in Fig. 11 may be considered as representative of both the vein pump pulsation eliminator 34 and the artery pump pulsation eliminator 44.

The pulsation eliminators may be briefly described as an expandable reservoir, wherein the pulsations in the blood flow are absorbed by the walls of the container and are not transmitted into the blood leaving the main reservoir of the pulsation eliminator. The pulsation eliminator comprises a latex rubber finger cot 196 mounted on a rubber stopper 197. The wall of the finger cot 196 should be stiff enough to withstand the pressure normally exerted against it without stretching excessively. As a protective device, in order to prevent any unusually high pressures from bursting the finger cot 196, the rubber stopper 197, with the finger cot attached, is fitted into a rigid receptacle 195, which may be a suitable glass container of proper diameter.

Blood enters the pulsation eliminator via the entry tube 198, which is mounted in the rubber stopper 197. The entrance tube 198 extends to the bottom of the finger cot 196 in its normal position. The exit tube 199 for the blood is mounted adjacent to the entry tube 198 in the stopper 197. The exit tube 199, however, does not project any appreciable distance beyond the base of the stopper 197. This arrangement assures a uniform flow of blood from the bottom to the top of the finger cot 196 and prevents the formation of air pockets.

The effectiveness of the pulsation eliminator is due to the ability of the finger cot 196 to expand and to contract quickly in response to pulsatory changes in the blood flow. The pulsation eliminator efficiently reduces any pulsatory effects because the velocity of the flow of blood is reduced to a low value in the finger cot 196, and while thus being reduced reacts only upon the walls of the finger cot 196 and not in any appreciable degree upon the blood leaving the pulsation eliminator via the exit tube 199. Since the finger cot 196 can expand and contract under small changes in pressure enough to take up the deficiency between the pulsatory flow from the pumps and the steady flow desired, the pressure in the finger cot 196 is practically constant; hence, the velocity of the blood leaving the pulsation eliminator assembly via the tube 199 is also approximately constant.

(g) THE OXYGENATING DEVICE

An essential part of an extracorporeal circulation device to replace the cardio-respiratory system in a human being or animal is a device for introducing oxygen into the venous blood.

Generally, the introduction of oxygen into venous blood is a problem beset by many difficulties. In order to introduce an adequate amount of oxygen into a moving stream of venous blood, it is desirable to spread the blood into a very thin film, in order to provide a large surface area while utilizing a relatively small volume of blood. Such a film has been produced in a variety of ways, for example, by centrifugal force, by bubbles, by flow through a hanging cloth curtain, and by passage over glass beads. In general, the difficulties encountered in the introduction of a sufficient amount of oxygen into the venous blood are foaming and frothing of the blood in its passage through the oxygenating device, hemolysis of the blood from the trauma, and a production of vasoconstrictor substances in the blood from mechanical agitation.

The method utilized in this device for obtaining a large surface area from a small volume of blood is to evenly distribute the blood on the inner surface of a vertical rotating cylinder. The centrifugal force insures the maintenance of a thin film of blood on the inner surface of the cylinder. The blood passes, under the influence of gravity, downwardly along the inner surface of the rotating cylinder and is collected in a stationary receptacle, into which the lower extremity of the revolving cylinder extends. In passage throughout the oxygenating device it is desirable to avoid foaming and hemolysis of the blood. The presently preferred structure, as illustrated in the drawings, is an improved device, which provides an oxygenating system of large surface-to-volume ratio and oxygenates the venous blood with a minimum of frothing and hemolysis.

The presently preferred oxygenating device 36 is illustrated in Figs. 12, 13, 14 and 15. The oxygenating device consists of a vertical rotatable external cylinder 204, having an upper collar 205 peripherally disposed on the upper extremity of the cylinder. Engaging the collar 205 and serving as an upper mounting member is an upper cover 206. The upper cover 206 terminates in a centrally disposed vertical sleeve 207, which serves as a mount for a rotating raceway 208, which forms a part of the upper bearing 209. The stationary raceway 203 is mounted on a non-rotating external support member 202.

The lower extremity of the cylinder 204 is peripherally encircled by a lower collar 210. The lower collar 210 has a peripheral receptacle 211 disposed to contain a V-belt 212 utilized to rotate the cylinder 204. The lower end of the cylinder 204 terminates in an outwardly tapered edge 213 continuously formed by the wall of the cylinder 204 and a portion of the lower collar 210. The lower end of the cylinder 204, including the tapered portion 213, extends into an annular stationary collector receptacle or bowl 214. The collector bowl 214 is shaped so that the blood draining from the rotating cylinder 204 via the tapered edge 213 is thrown tangentially on to the adjacent surface of the bowl 214 with a minimum of impact and change of direction, i. e., the blood is flung tangentially from the cylinder into the collector bowl 214, which is shaped to receive the blood with a minimum of impact. Also, the walls and bottom of the collector bowl 214 are sloped to make the blood flow to a tapered outlet spout 215 disposed in the lowest portion of the bowl 214.

The rotating cylinder 204 and the stationary collector bowl 214 are supported by a lower mounting assembly disposed to support said bowl 214 and said cylinder 204 in non-rotating and rotating engagement, respectively, which comprises a main base and support segment 216 supported by the main mounting struts 217. Disposed above the mounting struts 217 is a non-rotating cylindrical support member 218, which engages and supports the underside of the outer surface of the collector bowl 214. Disposed adjacent to the cylindrical support member 218, and in clamping engagement with the inner surface of the collector bowl 214, is a non-rotating internal support member 219. The base segment 216, the mounting struts 217, the cylindrical support member 218, and the internal supporting member 219, are held in compressive assembled engagement by the bolts 225 and 226.

The non-rotating cylindrical support member 218 provides a mounting for a stationary raceway 220 for the lower bearing 221. Disposed adjacent to the stationary raceway 220 and separated therefrom by the rolling members of the bearing is a rotating raceway 222, which is mounted on a rotating sleeve 223. The rotating sleeve 223 supports the rotating cylinder 204. The rotating sleeve 223 is integrally connected via the struts 227 to the periphery of the rotating cylinder 204 and through said struts 227 supports the weight of said cylinder 204.

Within the rotating cylinder 204 and concentric with it is a stationary cylinder 232 closed at each end, as at 232a and 232b. This cylinder is so spaced within the rotating cylinder 204 so as to provide a narrow annular space between the external surface of the internally disposed non-rotating cylinder 232 and the internal surface of the externally disposed rotating cylinder 204. Disposed within the stationary cylinder is a narrow vertical pocket 233, which serves as a receptacle for the blood inlet jet assembly. Axially disposed on the upper surface of the internal non-rotating cylinder 232 is a shaft 234 held in non-rotative arrangement axially within the rotating sleeve 207. Slidably disposed within the shaft 234 is a vertical jet positioning rod 235. Disposed adjacent to the jet positioning rod 235 within the shaft 234 is the blood supply tube 35 (see Fig. 3). Mounted on the lower end of the jet positioning rod 235 is a horizontal jet mounting bracket 237, which terminates in the mount 238 for the jet nozzle 239 and the blood supply tube 35. The mount 238 includes a knurled thumbscrew 240 for fastening the nozzle 239 to the mounting bracket 237. The nozzle 239 is disposed adjacent to the inner surface of the rotating cylinder 204. For the rates of flow utilized in the device the nozzle is designed to give the venous blood a velocity approximating that of the periphery of the rotating cylinder. In addition, the nozzle is preset in position so the direction of the blood flow is approximately tangential to the cylinder periphery. Thus, the blood leaving the nozzle is approximately the same in magnitude and direction as the peripheral velocity of the cylinder 204. Therefore, only slight impact occurs as the blood transfers to the cylinder. The lessening of the impact reduces hemolysis and frothing of the blood.

The jet assembly is slidably contained within the vertical pocket 233 and provides a positive means for forming a thin film of blood on the entire inner surface of the rotating cylinder 204. The rotation of the cylinder 204 and the slidability of the jet assembly aid in the formation of a uniform film of blood without the formation of rivluets and provide for an even discharge of blood over the entire periphery of the cylinder. By raising the jet nozzle 239 gradually while the cylinder 204 is rotating, the blood issuing from the jet 239 contacts every inch of the surface of the cylinder 204 and forms a uniform thin film without rivulet formation. Once the cylinder surface is wetted, the film will remain as long as the blood flows and the cylinder rotates. Moreover, provision has been incorporated to position the jet assembly at any intermediate level, thus giving the oxygenating device 36 a variable oxygenating capacity.

The internal non-rotating cylinder 232 is mounted on the lower support shaft 241, which is contained within a non-rotating central supporting member 224. The non-rotating central supporting member 224 is secured to the lower base segment 216 in non-rotative engagement and is axially disposed within the rotating sleeve 223. Disposed within the central support member 224 adjacent to the lower support shaft 241 is the air inlet tube 242 (see Fig. 3). The lower mounting arrangement thus provides for a positively rotating outer cylinder 204, a non-rotating collector bowl 214, and a non-rotating inner cylinder 232.

Figure 13 shows the presently preferred construction for locking the jet assembly at any desired level. There is provided a sleeve 244 enclosing the slidable jet positioning rod 235. Secured to the sleeve 244 is a collar 245. The collar 245 serves as a mount for a vertically protruding pin 246. Disposed above the collar 245 and fitting loosely on the rod 235 is a locking collar 247. The pin 246 serves as a fulcrum to tilt the locking collar 247 into tight frictional contact with the jet positioning rod 235. Thus, whenever it is desired to lock the jet assembly in a raised position, the locking collar 247 is permitted to tilt on the pin 246. The resultant cramping action between the locking collar 247 and the jet positioning rod 235 is sufficient to hold the jet assembly 239 at any desired elevational location.

The above described oxygenating device is the "lung" of the oxygenator assembly. In operation the outer cylinder 204 is rotated by the action of the V-belt 212, and the venous blood is evenly distributed by the jet 239 upon the inside surface of the rotating cylinder 204. The rotating cylinder 204 and the stationary cylinder 232 mounted concentrically within the outer rotating cylinder 204 provide an annular space between the two cylinders. The gas, principally oxygen with some carbon dioxide, water vapor, and ether, enters the bottom of the oxygenating device through the tube 242 and passes upward through the annular space. Since the annular space is small, all the gas in its upward flow in this space has an excellent opportunity for contacting the downwardly flowing film of blood. During this passage some of the oxygen and ether is transferred to the blood and the venous blood is thereby oxygenated. The gas leaves the annular space at the top of the assembly and is drawn off through the air exhaust system via the tube 250 (see Fig. 3).

It is desirable to prevent the escape of the oxygen and the other gases from the space between the rotating and stationary members in the oxygenating device during operation. To prevent the escape of the gases, annular grooves, such as 249, are included between the adjacent surfaces of the stationary collector bowl 214 and the rotating collar 210 as partial gas seals. These seals, while not as effective as a sliding type seal, are presently preferred because of reduced frictional effects and the ever-present possibility of combustion in an atmosphere of high oxygen concentration.

The entire oxygenating device, except for the rubber tubing 35 in the slidable jet assembly, the bearings 209 and 221, is preferably made of Inconel. This metal was preferred and used because of its very high resistance to corrosion from blood. Inconel is an alloy manufactured by the International Nickel Company and has the following composition:

79.50% Nickel
13.00% Chromium
 6.50% Iron
  .25% Manganese
  .85% Silicon
  .08% Carbon
  .20% Copper (h) ARTERY PUMP CONTROL ASSEMBLY The artery pump control assembly is illustrated in Fig. 12 and in detail in Fig. 16. A long-necked flask 257 is disposed beneath the tapered spout 215 of the collector bowl 214 to receive the blood draining therefrom.

Disposed adjacent to the narrow neck of the flask 257 is a dual light source 256. The light from the light source 256 is directed through the elongated neck 254 of the flshk 257 and on to the light sensitive photocell 255.

The photocell 255 is electrically connected to an electronic control circuit, which will be described in detail at a later point in this specification. This control circuit controls the rate of pumping of the arterial blood. The rate of pumping of the arterial blood is made to be responsive to the blood level in the elongated neck 254 of the flask 257. If the blood in the neck 254 drops below a predetermined level which is indicative of the fact that the blood is being removed from the flask 257 too rapidly, the artery pump 39 will be slowed down, and if the blood level rises above a predetermined level which is indicative of the fact that the blood is not being removed from the flask 257 with sufficient rapidity, the artery pump 39 will be speeded up. Thus, the arterial pumping rates are responsive to the level of blood in the flask 257. The flask 257 contains an aperture

258 disposed in the lower portions thereof to permit continual removal of the arterial blood via the tube 38 (see Fig. 3).

The long-necked flask 257 is preferred, so that the variation in total volume, as represented by the variations in the blood level in the elongated neck 254, is small. This provides a sensitive arterial pump control responsive to small volumetric changes in the blood volume in the flask 257. A sensitive control is necessary, as it is essential to prevent emptying of the flask 257, for such emptying would introduce air into the arterial blood system. This entry of air might result in a fatal gas embolism in the subject.

(i) THE ARTERY PUMP, ARTERY CUVETTE AND ARTERY PUMP PULSATION ELIMINATOR

The artery pump illustrated at 39 on Figs. 2 and 3 is similar in construction with the vein pump 28. The construction of these pumps is shown in detail in Fig. 10 and described in detail in paragraph (e) above.

The artery cuvette assembly 43 in Figs. 2 and 3 is identical in construction with the vein cuvette assembly 26, which is shown in detail in Figs. 9, 9a and 9b and described in section (d) above.

The artery pump pulsation eliminator 44 in Figs. 2 and 3 is identical in construction with the vein pump pulsation eliminator 34, shown in detail in Fig. 11 and described above in section (f).

(j) THE PULSATOR

In the animal and the human body it has been found that the pulse which accompanies the pumping of blood into the arteries by the heart is essential to the proper functioning of particular organs. The rotating action artery pump 39 introduces pulsations into the flowing arterial blood. However, these pulsations are uncontrolled and undesirable. These pulsations are removed in the artery pump pulsation eliminator 44. In order to reintroduce a measured controlled pulsation into the arterial blood, the pulsator unit 46, shown in detail in Fig. 17, is included in the blood circulation components.

The pulsator unit includes a stationary anvil 260, which supports a collapsible tube, such as 45, containing the arterial blood. Engaging the tube 45 is a reciprocating V-shaped block 262 mounted on a shaft 263, which is contained within a housing 261. The reciprocation of the V-shaped block 262 against the anvil 260 results in deforming the rubber tube 45 carrying the arterial blood and thus introducing a pulsation into the flowing arterial blood.

To provide for the reciprocation of the V-shaped block 262, there is provided a cam 265 mounted on a shaft 266. The shaft 266 is geared to a drive motor behind the mounting panel 14 and not shown in this drawing. Engaging the cam 265 is a cam follower assembly 267. The cam follower assembly 267 includes a roller 268, which engages the surface of the cam 265, mounted in a block 269. The block 269 is mounted on the shaft 263, which terminates in the V-block 262. The cam follower assembly 267 is held in compressive engagement with the surface of the cam 265 by the spring 264.

The repetition rate of the introduced pulsations can be manually controlled by adjusting the speed of the motor that rotates the shaft 266. The relative duration and modulation of each pulse is determined by the shape of the cam 265. As the cam 265 is fastened directly to the shaft 266, it may readily be removed and be replaced by one of different characteristics.

(k) THE GRAVITY VALVE ASSEMBLY

It has been found in operations upon the heart and its associated vessels utilizing a complete occlusion of the pulmonary artery that blood from the coronary system collects at the heart. It is desirable to draw this blood away periodically.

Provision has been included in the oxygenator assembly to periodically remove the blood which collects in the coronary system. To accomplish this result, as shown in Figs. 2 and 3, there is provided an external heart tube 49, which may be connected to the supply of blood in question. This tube 49 is directly and separately connected to the vein pump 28 and the rotation of the vein pump 28 draws the blood directly from the coronary system. In the exit side of the vein pump 28, the tube 49 leads to a gravity valve assembly 50. The blood upon leaving the gravity valve assembly 50 is transmitted via the tube 51 into the main venous circulatory system and reintroduced into the vein pump 28.

Fig. 18 shows in detail the presently preferred construction of the gravity valve assembly. As described above in connection with Fig. 2, the blood is drawn directly from the patient's coronary system and pumped by the vein pump 28 into the inlet tube 280 of the gravity valve via the rubber tube 49. The blood leaves the gravity valve via the outlet tube 279 and the rubber tube 51.

There is provided a flat rectangular mounting bracket 272, having perpendicularly mounted thereon the lower guide member 273, the upper guide member 274 and the stopper bracket 275. The lower bracket 273 and the upper bracket 274 each has a centrally located aperture disposed to encompass a cylindrical glass container or bottle 276. The glass container 276 has an outwardly extending lip 276a and is supported above the upper mounting bracket 274 by a coiled spring 277 disposed between said upper bracket 274 and said extending lip 276a. Mounted above the neck of the container 276 and positioned by the stopper bracket 275 is a two-holed rubber stopper 278 having the tubes 279 and 280 disposed in parallel alignment in the holes. The lower end of the outlet tube 279 is surrounded by a rubber tube 281 which acts as a seal against the bottom of the bottle 276. The spring 277 is of a construction which will support the bottle 276 in closed engagement with the stopper 278 when said bottle is either empty or contains less than a predetermined amount of blood.

In operation the blood from the coronary system enters the bottle 276 via the tube 49 and the inlet tube 280. Prior to the entry of any blood, the bottle is held and supported by the spring 277 in closed engagement with the rubber tube 281. As blood is introduced into the bottle 276, the seal between a rubber tube 281 mounted on the bottom of the tube 279 and the bottom of the bottle prevents the passage of blood out of the bottle via tubes 279 and 51 and into the vein circuit. However, as the blood level rises, the weight of blood contained in the bottle 276 becomes sufficient to overcome the force of the spring 277 and of the vacuum in the tube 279, which is always present because of the direct connection between tube 279 and the low pressure side of the vein pump 28, thus causing the bottle 276 to drop. As the bottle drops down, the seal between the rubber tube 281 and the bottom of the bottle 276 is broken and the blood contained in the bottle is drawn up via tube 279 and reintroduced into the vein circuit via tube 51. Blood will continue to be drawn out of the bottle 276 until the weight of blood contained therein is no longer sufficient to maintain the bottle 276 in a disengaged position with respect to the rubber tube 281. After a sufficient amount of blood has been withdrawn, the spring 277 will force the bottle 276 up into engagement with the rubber tube 281 and the cycle will repeat itself.

The operation of this valve is designed to prevent either the emptying or the overflowing of the bottle 276.

(*l*) SUPPORTING MEMBERS

In the oxygenator assembly it is desirable to support all the tubing, both rubber and glass, away from and out of contact with the mounting panel 14. The presently preferred form of clamp and supporting member is illustrated in Fig. 23. The clamp has a flat base portion 615, which is normally held adjacent to and secured to the mounting panel 14 by a suitable screw or bolt 616. Extending outwardly from the base portion 615 are two resilient springlike arm members 617, 618. The arm members terminate in arcuate portions 619, 620, having outwardly turned ends 621, 622. Intermediate the arcuate portions 619, 620 and the base portion 615, the arms 617, 618 are bent into engagement with each other as at 623. The arcuate portions 619, 620, and the extended ends 621, 622 readily permit the introduction and easy removal of a segment of tubing, such as 624. The spring characteristics of the member provide for a firm gripping of the tube and its support a fixed distance from the mounting plate 14.

(B) *Gas supply components*

(a) GENERAL

For operation of the oxygenating device, it is necessary to introduce oxygen and a certain percentage of carbon dioxide into the annular space between the rotating cylinder 204 and non-rotating cylinder 232 in the oxygenating device 36 (see Fig. 12). These gases, which are introduced into the flowing blood in the oxygenating device 36, are supplied by an integral gas supply and transmitting system.

Fig. 2 shows schematically the arrangement of the gas supply and transmitting components. There is provided a supply of oxygen 286 and a supply of carbon dioxide 287. Included therein are suitable valve and control mechanisms, such as those represented schematically at 289 and 298 on Fig. 2, to control and regulate the amount of carbon dioxide and oxygen, respectively. The oxygen and carbon dioxide gases are then fed through a common conduit and heated by a gas heater 292. The gas heater 292 is included to raise the temperature of the gases to a temperature approximating the operating temperature of the oxygenator assembly. On the downstream side of the gas heater 292 a portion of the gas is drawn off through the gas analysis system. A portion of this drawn-off gas diffuses through the gas analyzer 294 and the remainder passes through a flow meter 295. Also included is a needle valve member 296 to provide a fine control of the flow of gas through the gas analysis system.

After leaving the gas heater 292, the main flow of gas is then wetted by bubbling through a water bottle 293 and introduced into the oxygenating device 36 via the tube 242. Included in the line between the water bottle and the oxygenating device 36 is a thermo-couple 291, which is utilized to provide a continual indication of the temperature of the flowing gas stream.

(b) OXYGEN AND CARBON DIOXIDE SUPPLY

Figure 20:
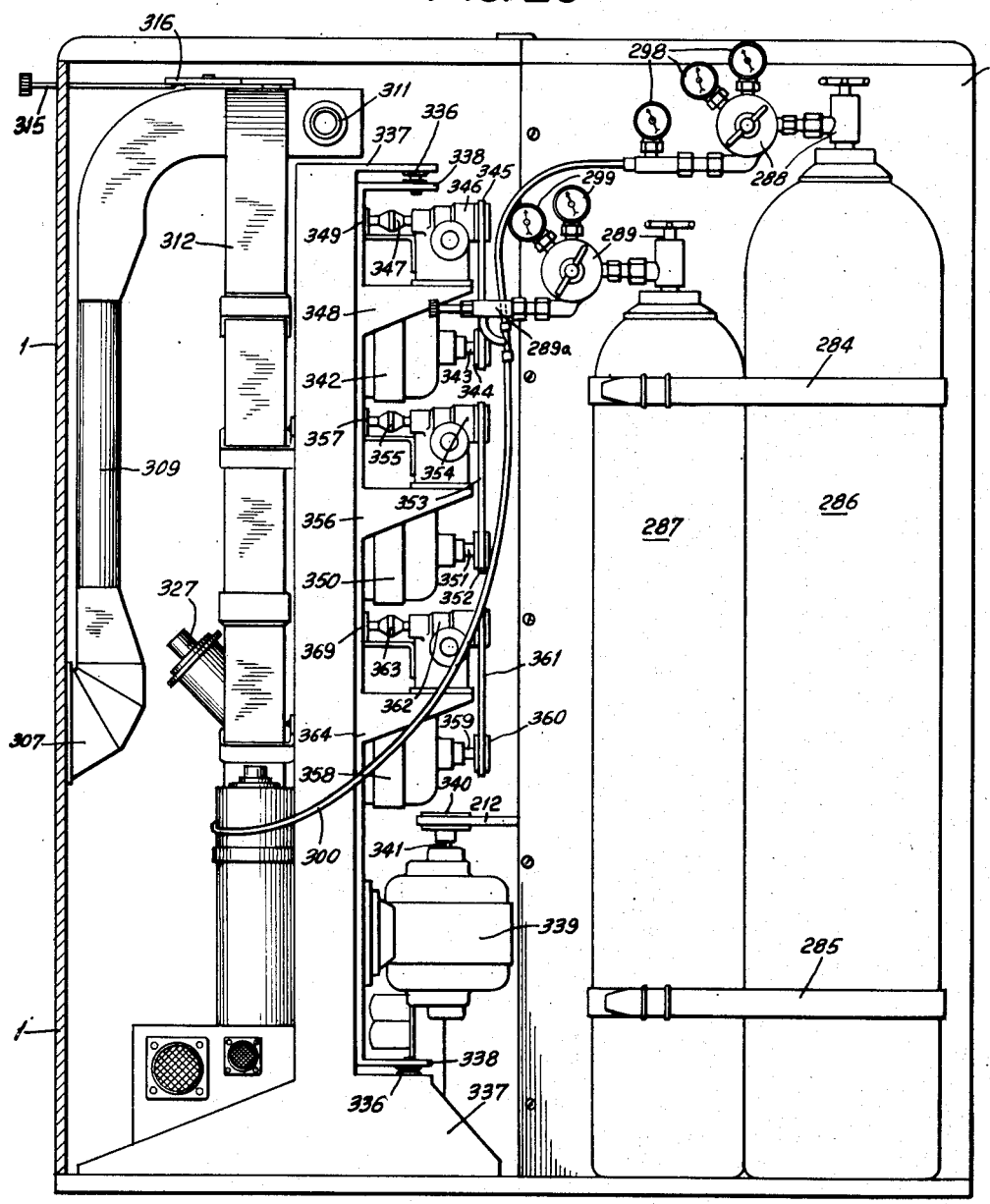
Fig. 20 is a view of the rear of the oxygenator assembly cabinet showing the gas supply and transmitting system, the motor drive system and the air duct assembly.

The oxygen and carbon dioxide gases are supplied in conventional commercial cylindrical tanks, such as 286 and 287 in Fig. 20. These tanks are externally mounted in an upright position on the rear wall of the cabinet 1 of the oxygenating assembly and secured by the straps 284 and 285. Each of the tanks has a conventional set of valves, such as 288 and 289, for regulating the flow of gas from each of the tanks. In addition, the carbon dioxide cylinder 287 has a needle valve 289a included to permit a close control over the amounts of carbon dioxide introduced into the system. In the presently preferred embodiment, as illustrated in the drawings, the oxygen and carbon dioxide cylinders 286 and 287 are provided with a set of gauges 298 and 299, respectively, to provide a visual indication of the rates of flow therefrom.

The gases are transmitted from the supply cylinders into the oxygenating assembly via the tube 300.

(c) GAS HEATER AND GAS ANALYSIS COMPONENTS

The oxygen and carbon dioxide gases expand upon release from their respective cylinders and in expanding the temperatures of the gases are reduced to a temperature below that of room temperature. It is desirable to hold the temperature of the oxygenating assembly constant at the body temperature of the subject. The introduction of this cooled gas into the oxygenating device 36 (see Fig. 2) would tend to lower the temperature of the downwardly flowing blood, a circumstance which would be undesirable. Provision has been included, therefore, to heat the oxygen and carbon dioxide gases en route to the oxygenating device. The gases must be heated sufficiently to raise them from a temperature below room temperature to a temperature in the vicinity of the body temperature of the subject. This is accomplished by passing the gases through a gas heating unit.

Referring to Fig. 21, the tube 300 is joined to a spirally wound Inconel tube 302. The Inconel tube 302 is wound about a copper core member 301. The copper core 301 has a heating cartridge (not shown on drawings) inserted therein. Also mounted on the copper core 301 is a temperature regulator 304. The entire heating unit is enclosed in a housing 305. After leaving the spirally wound section of Inconel tubing 302 the heated gas leaves the gas heater via the tube 303 and passes through the mounting plate 14 into the front of the oxygenator assembly cabinet 1.

Referring now to Fig. 3. After leaving the gas heater the tube 303 enters the front of the oxygenating cabinet 1 through the mounting plate 14. The gas line 303 then branches into the main gas line 303a and the gas analysis branch 303b.

In order to determine the concentration of oxygen in the gas mixture, a small quantity of the gas is diverted from the gas analysis branch 303b into the gas analyzer 294 (see Figs. 2 and 3). The gas analyzer 294 embodied in the gas system is of the thermal conductivity type, which depends for its operation upon the differing thermal conductivities of oxygen and carbon dioxide. The gas analyzer cell 294 and the associated electrical equipment for standard manufactured articles, and the cell is known as the "Englehard All Quartz Conductivity Cell." Gas is continuously passed by the end of the sampling cell rather than through it. As the sampling cell is open to the gas, however, diffusion makes the sample uniform and representative of the gas flowing through the oxygenator assembly. The electrical circuits of the analyzer will be described at a later point in the specification.

After passing the gas analyzer 294, the gas in the branch 303b flows through a flow meter 295. This flow meter 295 is a standard manufactured article, towards which no claim of novelty is directed.

The terminal point of the gas analyzer branch is a needle valve 296. This needle valve is included to hold the flow of gas past the gas analyzer 294 to a controlled value. Obviously, it is desirable to keep this value very small, and the normal rate of flow past the gas analyzer 294 will be somewhere in the neighborhood of $\frac{1}{10}$ of a cubic foot per hour. The gas escapes from the valve in the oxygenator cabinet.

(d) MISCELLANEOUS COMPONENTS

The gases released from the oxygen and carbon dioxide cylinders 286 and 287 are commercial dry gases. The dry characteristics of the gases lead to a tendency for them to absorb moisture at the earliest opportunity. If the dry gases were introduced into the oxygenating device 36 in contact with the downwardly moving film of blood, the gases would absorb moisture from the flowing blood. To avoid this difficulty, the gas is preliminarily wetted by bubbling it through a bottle of water, such as 293 on Figs. 2 and 3. The bubbling of the gas through the water bottle 293 renders unlikely any dehydration of the flowing blood in the oxygenating device 36. Upon leaving the water bottle, the now wetted gas is conducted via tube 242 and introduced into the oxygenating device 36.

In operational utilization of extracorporeal circulation devices, it is necessary to anesthetize the subject. Certain forms of anesthesia may be administered directly to the subject; however, those forms which must be inhaled necessarily can be administered only through the oxygenating assembly, as the subject's lungs are inoperative during the period of operation.

Ether is one of those forms of anesthetic. In order to administer the anesthetic, it is necessary to introduce the ether into the gas transmitting sysem. It is recommended to introduce the ether between the junction of the carbon dioxide and oxygen lines and the gas heater.

If ether is used as an anesthetic, the gas analysis system will be upset by the introduction of the ether in indefinite proportions. Hence, before taking a reading from the gas analysis system, it is desirable that the introduction of ether be discontinued for a period of time prior to the analysis.

(C) *Temperature control assembly*

(a) AIR DUCT ASSEMBLY

The presently preferred medium for heating the oxygenator assembly is air, and provision has been included for regulating the amount of heat introduced into the air in the oxygenator assembly and for controlling the introduction and exhaust of the air contained therein. To accomplish this temperature regulation, there is provided an intergral air duct assembly. This air duct assembly, in addition to supplying heat to the flowing air, also proportions the amount of fresh air that may be taken in during recirculation of the air contained therein through the system.

The air duct assembly is illustrated in detail in Figs. 19 through 22. A fresh air intake vent 307 (see also Fig. 1) is located on the side of the oxygenator cabinet 1. In order to prevent dust from entering the oxygenator cabinet 1 through the fresh air intake vent 307, a multiple wire mesh screen filter 308 is inserted into said vent 307 (see Fig. 1). Connected to the fresh air intake vent 307 is the fresh air intake duct 309, which guides the incoming fresh air to the proportioning assembly.

The proportioning assembly is a station where the air being exhausted from the oxygenating assembly cabinet 1 via the exhaust vent 310, meets and mixes with the fresh air entering via the fresh air intake duct 309. In addition, the air exhaust duct 311 is connected to the proportioning assembly. Included in the proportioning assembly are a pair of vanes 313 and 314. The vane 313 is rotatably mounted on a shaft 319a and is positioned across the air exhaust duct 311. The vane 314 is rotatably mounted on a shaft 317 and is positioned across the fresh air intake duct 309. The vanes are moved in unison so as to direct an amount of air out through the exhaust duct 311 equal to the amount of fresh air entering via the duct 309.

The positioning of the vanes 313, 314 is accomplished by the following mechanical linkage. An operating rod 315, one end of which extends outwardly from the cabinet 1, is connected to one arm of a bell crank 316. The bell crank 316 is secured to and pivots about the shaft 317. The shaft 317 has mounted thereon the vane 314. Thus, a reciprocation of the operating rod 315 results in a rotation of the vane 314. The other arm of the bell crank 316 is secured to a connecting rod 318. The connecting rod 318 has an arcuate slot 318a and is mounted on a bolt 320 contained therein. The other end of the connecting rod 318 is secured to an arm 319. The arm 319 is secured to and pivots about the shaft 319a, which also mounts the vane 313. The rotation of the bell crank 316 about the shaft 317 causes the connecting rod 318 to slide with respect to the bolt 320. The sliding movement of the connecting rod leads to a rotation of the arm 319, which in turn rotates the vane 313 an amount equal to the rotation of the vane 314.

The exhaust duct 311 extends to the rear of the cabinet 1. In addition to the main exhaust path, a path for moving the unused and waste gases from the oxygenating device 36 directly to the exhaust duct 311 is provided via the tube 250 (see Fig. 3). The tube 250 carries the spent gases from the oxygenating device 36 to the exhaust duct 311 via the exhaust vent 310. The tube 250 bypasses the vane 313. This arrangement is necessitated because the spent gas from the oxygenating device 36 may contain a high percentage or ether, which should be expelled from the device and not be recirculated. During operational procedures, it is recommended that a hose be attached to the exhaust duct 311 to transfer the exhaust vapors out of the room and into the open air.

After the air to be recirculated leaves the proportioning section of the air duct system, it passes through the air recirculation duct 312. Normally this air must be heated, because the heat lost through radiation from the cabinet must be constantly replenished, and in addition, the fresh air taken in via the duct 309 must be raised from room temperature to the body temperature of the subject. To raise the temperature of the recirculated air, there is provided a heating unit disposed within the air duct 312. The heating unit includes a heavy copper bar 325 having a heating cartridge 326 disposed therein. Also mounted in the air recirculation duct 312 on the downstream side of the heating unit is a thermo regulator 327. The thermo regulator controls the application of electric power to the heating cartridge 326.

On the downstream side of the thermo regulator 327 is a blower assembly, which moves the air in the air duct assembly. The motive power for the air circulation is supplied by an electric motor 328, having a centrifugal blower 329 mounted on the motor shaft and disposed within the duct 312. The centrifugal blower 329 forces the air into the oxygenator cabinet via the air outlet duct 331 and is joined thereto by a flexible rubber sleeve 330. The stream of air is directed within the oxygenating chamber by the curved director 332 mounted over the air outlet duct 331. The blower assembly described above is of the centrifugal type and is designed to move about 100 cubic feet of air per minute.

Summing up the air duct assembly, provision has been included for introducing recirculated air into the lower portion of the oxygenating cabinet 1, removing the air from the upper portions of the oxygenating cabinet 1, and proportioning the amount of fresh air introduced to the system, as well as stale air exhausted from the system at all times. In addition, the temperature of the recirculated air is continually and automatically controlled.

(D) *The motor and associated drive system*

(a) GENERAL

Figure 19:
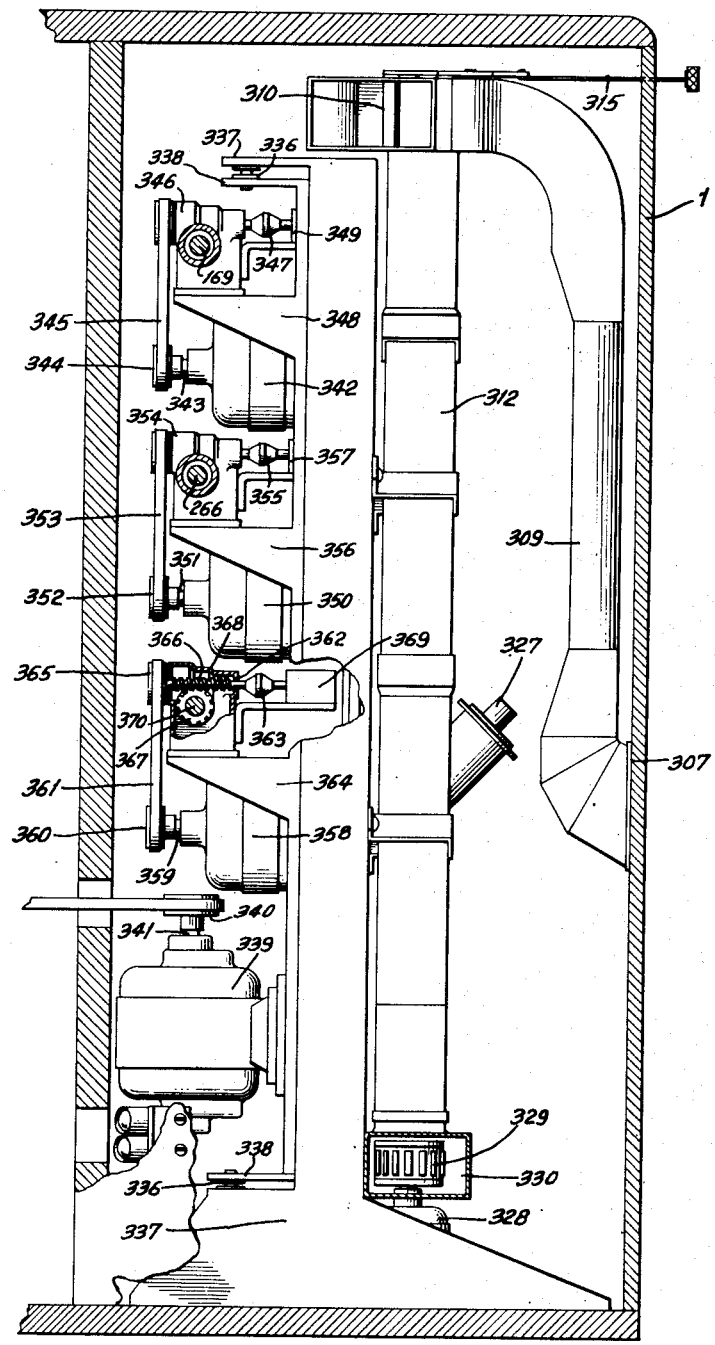
Fig. 19 is a plan view, partially in section, of the rear of the oxygenator assembly cabinet showing the motor drives and the air duct assembly.

The motor compartment is disposed in the right rear portion of the cabinet 1 behind the mounting plate 14 and is illustrated in Figs. 19 and 20. This section of the device is not insulated and is vented by natural convection to the room.

The motor compartment is the source of mechanical power for the operation of the oxygenating assembly. In order to reduce the transmission of vibration and noise, the motors for the oxygenator assembly are fastened to a resiliently mounted upright frame 338. The frame 338 is separated from a fixed mounting frame 337 by the resilient mounting members 336. The motors will now be considered individually.

(b) THE CYLINDER MOTOR

The cylinder motor 339 is mounted on the lower portions of the resiliently mounted frame 338. A pulley 340 is mounted upon the shaft 341 of the cylinder motor 339. Peripherally engaging the pulley is the belt 212, which encircles the periphery of the lower mounting collar 210 of the rotating cylinder 204 in the oxygenating device 36 (see Fig. 12). The rotation of the cylinder motor rotates the cylinder 204 in the oxygenating device 36. The electric circuits for the motor and the associated control system connected therewith will be described at a later point.

(c) THE VEIN PUMP MOTOR

Mounted on the upper portion of the resiliently mounted frame 338 and suspended from the mounting platform 348 is the vein pump motor 342. The shaft 343 of this motor 342 has mounted thereon a driving pulley 344. The driving pulley 344 is connected by a belt 345 to the speed reduction unit 346. The speed reduction unit 346 transmits the motive power supplied by the motor 342 into rotation of the shaft 169 (see Fig. 19) for the vein pump 28, described in detail in Fig. 10. The shaft 347 of the speed reduction unit 346 is connected directly to and drives a tachometer motor 349.

(d) PULSATOR MOTOR

Mounted on the middle portion of the resiliently mounted frame 338 and suspended from the mounting platform 356 is the pulsator motor 350. The shaft 351 of this motor 350 has mounted thereon a driving pulley 352. The driving pulley 352 is connected by a belt 353 to a speed reduction unit 354. The speed reduction unit 354 transmits the motive power supplied by the motor 350 into rotation of the shaft 266 for the pulsator 46, described in detail in Fig. 17. The shaft 355 of the speed reduction unit 354 is connected directly to and drives a tachometer motor 357.

(e) ARTERY PUMP MOTOR

Mounted on the lower portion of the resiliently mounted frame 338 and suspended from the mounting platform 364 is the artery pump motor 358. The shaft 359 of this motor 358 has mounted thereon a driving pulley 360. The driving pulley 360 is connected by a belt 361 to the speed reduction unit 362. The speed reduction unit 362 transmits the motive power supplied by the motor 358 into rotation of the shaft 370 for the artery pump 39, which is similar in construction to the pump described in detail in Fig. 10. The shaft 363 of the speed reduction unit 362 is connected directly to and drives a tachometer motor 369.

(f) THE SPEED REDUCING UNIT

The detached structure of the speed reduction unit 362 is shown in detail in Fig. 19. The motive power from the artery motor 358 is supplied by the belt 361 to the pulley 365. The shaft supporting the pulley 365 has a worm 366 mounted thereon. The worm 366 engages a worm gear 367 mounted on a shaft, such as 370. Said shaft 370 extends through the mounting plate 14 into the front of the oxygenator cabinet and provides the motive power for the artery pump 39 (see Figs. 2 and 3). The shaft 363 supporting the pulley 365 is directly connected to and drives the tachometer motor 369. The speed reduction unit is enclosed by a housing 368.

The speed reduction units 346 and 354 for the vein pump motor 342 and the pulsator motor 350 are identical in construction with that described in detail above. The detailed description of the speed reducing unit 362 described above will suffice in lieu of a detailed description of the other two speed reduction units.

(g) TACHOMETER SYSTEM

The tachometers 349, 357, 369 driven by the vein pump motor 342, the pulsator motor 350, and the artery pump motor 358, respectively, and the tachometer (not shown) driven by the cylinder motor 339, are small electric motors, being driven as generators. The output of these generators is directly proportional to their speeds of rotation, and hence provides a direct indication of their speeds. The outputs of the various tachometer motors are connected to suitable meters on the front panel 13 on the power, indicator, and control cabinet 10 and provide a visual indication of the speeds of the motor units.

II—POWER, INDICATOR, AND CONTROL ASSEMBLY

(A) General

(a) MAIN POWER SYSTEM

The power, indicator, and control assembly is largely contained within the cabinet 10 illustrated in Fig. 1. As mentioned at an earlier point in this specification, the cabinet 10 is mounted on wheels such as 11 and connected to the oxygenator assembly cabinet 1 by a shielded cable 12, which contains the electrical leads running between the oxygenating assembly and the power, indicator, and control assembly. The front panel 13 of the cabinet 10 has mounted thereon a plurality of switches, manual controls and visual indicating devices generally.

The individual components making up the power, indicator, and control assembly are best explained by reference to a circuit diagram of the various power, indicator, and control circuits. The circuit diagrams of these components are illustrated in Figs. 24a, 24b and 24c.

The primary source of power for operating the extracorporeal circulation device is a conventional 110-volt alternating current supply. There is provided a standard two-prong connector 380. The power leads connected thereto have included therein the main power switch 381, which controls the application of the source voltage to the alternating current supply busses 382 and 383. In addition, protective fuses 378 and 379 are series connected in both sides of the main alternating current line. The alternating current supply busses 382 and 383 provide a common source of alternating current power for the entire device and are to be found with the same numerical designation in Figs. 24a, 24b and 24c.

Direct current power is also provided for operation of many of the components. A large portion of direct current power is supplied by a common source, which is fed by the direct current power system illustrated in Fig. 24b. A suitable rectifier 385, such as a selenium or copper oxide type rectifier, is connected across the alternating current supply busses 382, 383, in series with a protective fuse 384. The rectified direct current potential from the other terminals of the rectifier 385 is supplied to the direct current supply busses 387 and 388. The direct current supply busses 387 and 388 provide the direct current power for a number of components illustrated in the drawings, and the same numerical designation, i. e., 387 and 388 is utilized on both Figs. 24b and 24c. A condenser 386 is shunted across the direct current terminals of the rectifier 385.

(b) TIME DELAY SYSTEM

A time delay system is included in the power, indicator, and control assembly to provide an interval during which the filaments of the vacuum tubes utilized in the extracorporeal circulation device may warm up before the main line voltage is applied. The time delay system provides a convenient method for delayedly actuating a suitable relay a predetermined time after the filaments of certain vacuum tubes have been energized. The presently preferred time delay circuits are illustrated in Fig. 24b. For the purposes of this description, we will illustrate the energization of a relay coil, and, at a later point in this specification, will describe the effects of the energization of the particular coil in question, which will be the closure of a set of transfer points. In the first time delay circuit, the heater 392 for the time delay relay 389 and the dropping resistor 391 are series connected across the DC mains 387 and 388 by the armature 390 contacting the point 393. The temperature of the heater 392 is increased by the current flow therethrough and after a predetermined time interval the relay 389 is energized by the armature 395 moving, in response to the rise in temperature, into contact with point 396. Thus, the above movement of the armature 395 directly connects the relay coil 389 across the direct current supply, and the resulting current flow therethrough results in the armature 390 transferring from point 393 to the point 394. This action breaks the circuit to the heater 392, so that as the heater 392 cools, the moving armature 395 is moved back to its rest position. Relay 389 is maintained energized through point 394 and armature 390, which are operated by relay 389. The other sets of points of the relay 389 are located in other circuits and will be described in detail at a later point.

A similar circuit is provided in parallel with the one above described, utilizing the heating element 401 and the dropping resistor 400 and the relay energizing coil 398. In operation this circuit works in exactly the same manner as that described above, i. e., normally, upon the application of direct current power to the busses 387, 388, the armature 399 will be in contact with the point 402, thus connecting the heating element 401 across the direct current supply. As the temperature rises due to current flow through the heater 401, the armature 404 makes contact with point 405. This action results in connecting the energization coil 398 of the relay across the direct current supply. The resultant flow through the energization coil 398 results in the actuation of the armature 399 to break contact with point 402 and to make contact with the point 403. This action completes a circuit across the direct current supply and assures a continual direct current supply for the energization coil 398. When the heater 401 cools, the armature 404 returns to its rest position.

(B) Gas analyzer system

The gas analysis system is included to provide a continual indication of the percentage of oxygen in the gas to be passed over the flowing blood. The circuit for the analyzer is illustrated in Fig. 24a. The power for the gas analysis system is supplied by a transformer 410, the primary of which is connected across the alternating current supply busses 382, 383. The secondary of the transformer 410 is connected across a bridge type selenium rectifier 411. The DC output from the rectifier 411 is filtered by a conventional filter 412, which includes the condensers 413 and 414 and the choke 415.

The operation of the gas analysis circuit is based upon the characteristic that the thermoconductivities of different gases are different. The direct current power is supplied to a Wheatstone bridge via the potentiometer 416 and the potentiometer and ammeter 421 and 422, respectively. Two of the arms of the Wheatstone bridge comprise fixed resistors 417 and 418. The sensitive measuring unit includes a platinum wire as the standard resistance element 419, which is sealed in a glass container 419a filled with pure oxygen. The other unit 420 of similar construction is exposed to the gas supply. The amount of unbalance in the bridge depends upon the difference in thermo-conductivities of the standard oxygen and the gas supply being examined. Connected across the mid-points of the bridge is an indicating galvanometer 423 suitably connected by the switch 425, the variable resistor 424 and a fixed resistor 426.

The indicating galvonometer 423 is physically located on the control panel 13 of the power, indicator, and control assembly 10, so that the operator may continually know the gas ratio without having to make a chemical analysis. The switch 425 is also located on the control panel and shorts the galvanometer 423 when not in use.

The above gas analysis circuit, together with the mechanical components described in Section I (B) (c) above, provide a continual automatic visual indication of the oxygen content of the gas being used to oxygenate the venous blood.

(C) Temperature control systems

(a) THE GAS TEMPERATURE CONTROL SYSTEM

As explained above in Section I (B) (c), it is preferred to heat the gas used to oxygenate the venous blood to a temperature approximating that of the body temperature of the subject. It is also necessary to regulate this gas temperature to maintain the temperature of the entire oxygenator assembly stable at a predetermined operating temperature. The gas supply components as described above include a heating element, which is utilized to raise the temperature of the gas on its way to the oxygenating device 36.

An automatic temperature control has been included to control the periods of operation of the above mentioned heating element. The temperature of the flowing gas is maintained approximately constant by automatically turning the heating element on and off in accordance with the temperature variations of the flowing gas.

The circuit diagram for the control system is illustrated in Fig. 24a. The control may generally be described as a system whereby the power to the heating element is applied and discontinued in accordance with the variations of a thermo-regulating unit. A set of relay transfer points are included in the heater circuit to make and break the circuit connecting said heating element across a power source. The relay itself is responsive to the thermo-regulating unit. The relay has been included because the points of the thermo-regulating unit are necessarily light and are not able to handle the amount of current required by the heater.

The temperature control circuit may be considered as a temperature responsive circuit, which includes the thermo-regulating unit and the energizing coil of a relay and a separate heater circuit. The heater circuit includes the heater element and a set of transfer points of the relay disposed in the temperature responsive circuit.

The temperature responsive circuit is connected across the alternating current supply busses 382 and 383, and includes a thermo-regulator schematically represented at 431 in series with the relay energizing coil 432, which is paralleled by a resistor 433. The thermo-regulator 431 consists of a conventional bimetal rod, which rotates as the bimetal rod changes in temperature. The turning action of the rod operates a set of points which make and break the circuit above described. When the circuit through the thermo-regulating unit 431 is completed, current flows through the energizing coil 432.

The energization of the relay coil 432 operates a set of transfer points 432a included in the heater circuit. The heater circuit includes the heating unit 434 connected in series with the above mentioned set of transfer points 432a and a switch 436, across the alternating current supply busses 382 and 383. When the temperature responsive circuit is completed across the supply busses 382, 383, the energization of the relay coil 432 results in the completion of the circuit through the heater 434, the switch 436 being normally in a closed position. The heater circuit, of course, will be opened when the thermoregulating unit 431 opens, thus deenergizing the relay coil 432.

The above control system provides a simple and automatic method for heating the flowing gas which is controlled by and responsive to the temperature of the gas itself.

(b) AIR CONDITIONING TEMPERATURE CONTROL

In order to keep the blood circulation components at the body temperature of the subject and to maintain the temperature of the entire device stable at a predetermined value, the oxygenator assembly cabinet 1 is made reasonably air-tight and with insulated walls to permit the air in the cabinet to be maintained at an approximately constant temperature. To maintain the air temperature in the oxygenating cabinet 1 approximately constant, an air conditioning temperature control, the circuit of which is illustrated in Fig. 24a, is provided. In order to minimize the preheating time for the device, the air in the cabinet is initially heated to a higher temperature for preheating than for maintaining the temperature during operations. This is necessary because of the lag in the temperature rise of the metal parts. To accomplish this result, there is provided a control which will initially maintain the power applied to the heating element until a predetermined air temperature is reached, at which time the control will then disengage itself and a second control will maintain the air temperature at a predetermined constant value.

The control circuit may be considered as a temperature responsive circuit, which includes a thermo-regulating unit, and the energizing coil of a relay, a separate heater circuit and a second temperature responsive circuit. The heater circuit includes a heating element, a set of transfer points responsive to the relay in the temperature responsive circuit and a manually operable switch. The second temperature responsive circuit is provided to aid in the high initial preheating and normal operational control.

The first temperature responsive circuit includes a thermo-regulating unit schematically represented at 442, relay transfer points 448b, and the relay energizing coil 440, which is paralleled by a resistor 441. These units are series connected across the alternating current supply busses 382 and 383. Connected in parallel with the above described circuit across the alternating current supply busses 382 and 383 is the second temperature responsive circuit. This second control circuit includes a relay energizing coil 448 in series with a set of transfer points 448a responsive to said energizing coil 448. The set of transfer points 448b in the first temperature responsive circuit is actuated by the energizing coil 448.

In the first temperature responsive circuit, the high temperature contact 443 of the thermo-regulating unit 442 is connected to the armature 449 of the set of transfer points 448a. The low temperature contact 444 of the thermo-regulating unit 442 is connected directly to the upper contact 446 of the set of transfer points 448b. The lower contact 447 of the transfer points 448b is connected directly to the alternating current supply bus 382.

In operation, the control works as follows, assuming the temperature to be below the predetermined desirable operating temperature and the switch 436a being in its closed position. When alternating power is applied to the alternating current supply busses 382 and 383 by a closure of the main switch 381, the thermo-regulator 442 will connect the supply voltage to the lower point 444. The armature 445 of the set of transfer points 448b will be in contact with the lower point 447, and current will flow through the energizing coil 440 via the lead 454, the lower contact 447, and armature 445 of the transfer points 448b. The current flow through the relay energizing coil 440 will actuate the transfer points 440a in the heater circuit. The armature 451 will contact the point 452 and complete the heater circuit connecting the heating element 326 across the alternating current supply busses 382 and 383. The heating circuit includes the heating element 326 series connected with the relay points 440a and the switch 436a across the alternating current supply busses 382 and 383. Thus, the thermo-regulating unit 442 will, when it makes contact on the low temperature side, i. e., 444, cause the heating element 326 to be connected across the power supply and thus raise the temperature of the circulating air in the duct 312 (see Fig. 21).

The control will remain in the above state until the armature of the thermo-regulating unit 442 makes contact on the high temperature contact 443. When the armature of the thermo-regulating unit 442 contacts the upper point 443, the relay energizing coil 448 is connected across the alternating current supply busses 382 and 383. The resultant current flow through the relay energizing coil 448 actuates the transfer points 448a and causes the armature 449 to contact the point 450. This connects the relay energizing coil 448 across the alternating current supply busses 382 and 383 for as long as the main power switch 381 is closed. In addition, the energizing of the coil 448 actuates the transfer points 448b and causes the armature 445 to break contact with the lower point 447 and engage the upper point 446, thus opening the circuit through the relay energizing coil 440. The deenergizing of the relay coil 440 actuates the set of transfer points 440a and opens the heater circuit. The first temperature responsive circuit is now open and will remain in that state until the armature of the thermo-regulating unit 442 again contacts the low temperature contact 444. At this time a circuit through the energizing coil 440 will again be completed, which will again close the heater circuit.

After the initial heating, it will be noted that the relay coil 448 is effectively removed from control of the circuit. After the operating temperature rises to a point sufficient to actuate the thermo-regulator 442, the armature will break its contact with the lower point 444. This opens the circuit through the relay energizing coil 440, which in turn will open the heater circuit. The shutting off of the heater 326 will not permit the armature to make contact with the high temperature point 443. Even if it did permit such contact, it would have no effect as the relay coil 448 is continually energized after the initial preheating and the current through the relay energizing coil 440 is maintained under the control of the thermoregulator armature 442 and point 444.

The above described control circuit automatically provides for a higher initial temperature during the preheating stage, and after the preheating temperature has been reached, provides for an automatic control of the operating temperature.

(c) AIR CONDITIONING BLOWER

In Section I (C) above, the motive power for moving the air through the air duct assembly was the electric motor 328, which drove the centrifugal blower 329 (see Figs. 19 and 21). The electric circuit and the control for the air conditioning blower motor are set forth on Fig. 24a. The speed of the motor 328 is controlled by the variable autotransformer 459, which is connected across the alternating current supply busses 382 and 383. The setting of the variable autotransformer, which is manually controlled, controls the armature and series field 458 current through the motor 328 and thus controls its speed.

(d) VENTILATING BLOWER

There are several elements in the power, indicator, and control cabinet 10 that generate considerable heat. A cooling blower has been incorporated in the power, indicator and control cabinet 10 for ventilation. In addition, louvers have been included in the panels making up the cabinet 10 to provide for an entrance and exhaust for circulating air. The circuit for the ventilating blower motor is set forth in Fig. 24a. There is provided a motor 462, whose speed is controlled by the setting of a variable autotransformer 463 connected across the alternating current supply busses 382 and 383. The setting of the variable autotransformer 463, which is manually controlled, controls the current flow through the armature and series field of the ventilating blower motor 462.

(D) *Blood proportioning control circuit*

The mechanical features of the blood proportioning device were described in Section I (A) (b). At that point the purposes and structure of the proportioning device were set forth and explained. The electrical circuit for automatic operation of the blood proportioning device is illustrated in Fig. 24b.

If two separate sources of venous blood are utilized, either may occlude. In order to relieve an occlusion, it is necessary to know which of these sources has occluded and to equalize or adjust the pressures in the blood tubes. The proportioning device as set forth in Section I (A) (b) above is incorporated into the extracorporeal circulation device to provide an indication as to which vein has occluded and to automatically readjust the capacity ratios of the two veins. The proportioning device works on the principle that when an occlusion takes place in either one of the veins, the pressure in that vein is reduced. In Figs. 4, 5, 6 and 7, a change in the level of the mercury 84 in the glass manometer 83 closed a circuit which actuated a control, which in turn set in motion mechanical means to relieve the occlusion.

The circuits for the blood proportioning device may be generally considered as a first circuit responsive to the balance of the mercury in the manometer above mentioned, an unbalance of which actuates a relay, and a second circuit, responsive to the actuation of the relay in the first circuit, which regulates and controls the actuation of the motor 98, which in turn rotates the cam 96 (see Fig. 5).

In the first circuit, the mercury manometer system is represented schematically by the switch 470. The moving element 471 of the switch 470 is connected to the direct current supply bus 387. The terminal 470a is connected to the direct current supply bus 388 through the relay energizing coil 466 and a limiting resistor 468. The other terminal 470b is connected to the direct current supply bus 388 through the relay energizing coil 467 and a limiting resistor 469. In normal operation, when the pressures in the two vein tubes are balanced, the arm 471 will be in contact with neither of the terminals 470a or 470b, and the circuits through the relay energizing coils will be open.

Connected between the direct current supply bus 387 and the terminal 470a is a resistor 472 and a condenser 474 in series. This resistor and condenser are provided to reduce arcing at the mercury switch. A similar protective resistor 473 and condenser 475 combination is provided to reduce the arcing at the other terminal 470b.

If the pressures in the vein tubes become unbalanced, the arm 471 will contact one of the terminals 470a or 470b depending on which vein becomes occluded. For the purposes of explaining the operation of the circuit, it will be assumed that the arm 471 contacts the terminal 470a. When this happens, assuming the manually operated switches 489 and 490 to be open, current flows through the relay energizing coil 466 and energizes said coil. This results in actuation of the transfer points 466a with the armature 476 contacting the terminal 476a and completing a circuit across the direct current supply, which includes the resistor 478, the relay coil 466, and the dropping resistor 468. In addition, the actuation of the set of transfer points 466a shunts a holding circuit, comprising the condenser 479 and the resistor 480 across the relay energizing coil 466. The energization of the relay energizing coil 466 actuates the transfer points 466b with the armature 482 closing and connecting the vein occlusion signal light 483 across the alternating current supply busses 382, 383. In addition, the set of transfer points 466c are actuated with the armature 485, completing a circuit through the windings 487 of the proportioning motor 98 and the resistor 488 across the alternating current supply busses 382 and 383. The completing of the circuit through the motor 98 causes said motor 98 to rotate in one direction. The rotation of the motor 98 in turn rotates the cam 96, which relieves the occlusion (see Figs. 4 and 5).

In the event the occlusion takes place in the other vein, the arm 471 will contact the terminal 470b. This will cause current to flow through the relay energizing coil 467 and the limiting resistor 469. The resulting current flow will energize the relay coil 467 and will result in the actuation of the transfer points 467a with armature 477 contacting the terminal 477a to complete the holding circuit. In addition, the transfer points 467b will be actuated with the armature 481 closing and connecting another vein occlusion signal light 484 across the alternating current supply busses 382, 383. In addition, the transfer points 467c will be actuated with the armature 486 connecting another winding 487 of the motor 98 across the alternating current supply busses 382, 383, to cause the motor 98 to rotate in the opposite direction.

When either occlusion is relieved, the arm 471 will return to its neutral position between the terminals 470a and 470b. When the circuit through the switch 471 is opened, the current flow through the energizing coils is insufficient to maintain the coils in an energized state due to the size of the series resistor 478. Therefore, shortly thereafter, depending on the constants of the holding circuit, the relay coils 466 and/or 467 will be deenergized and the circuits to the motor 98 and the signal lights will be opened.

The current flow through the relay energizing coils 466 and 467 results in the actuation of a fourth set of transfer points 466d and 467d located in the vein pump control circuit. These points, which will be described in detail at a later point in the specification, effectively control the vein pump motor 342 when the blood proportioning device is operatively included in the blood circulation components and the control is set for automatic operation.

The switches 489 and 490 are physically disposed on the outside of the power, indicator, and control cabinet 10 and bypass the mercury switch 470, in order to permit the blood capacity ratio in the external vein tubes 16 and 17 to be manually adjusted.

If both veins occlude, there will be no pressure difference in the proportioning device and the motor 98 will not operate and the vein pump control circuit later described will operate to stop the vein pump 28, indicating that the vein pump is demanding more blood than the veins can supply, but that the ratio is correct.

(E) *The pulse motor*

The physical location and mechanical linkage for the pulsator motor 350 is shown in Figs. 19 and 20. The electrical circuits for the pulse motor are shown in Fig. 24b. The pulse motor is a compound wound motor and the shunt field 496 is connected across the direct current supply busses 387, 388, through the limiting resistor 502. The armature and series field 497 are energized from their own direct current supply. The direct current supply is obtained from the rectifier 499, which is connected through a protective fuse 500 to a variable autotransformer 498, which in turn is connected across the alternating current supply busses 382, 383. Included in the line is a switch 503, by which the motor may be rendered inoperative. Shunted across the direct current output side of the rectifier 499 is a condenser 501.

The speed control of the motor is obtained by varying the current in the armature and series field 497, rather than varying the current in the shunt field 496. Adjusting the variable autotransformer 498 varies the D. C. output voltage from the rectifier 499, and, as the armature and series field 497 of the motor 350 are supplied from the rectifier 499, the speed is thus varied by varying the applied voltage. This particular arrangement allows the speed of the motor to be varied from zero up to its rated speed. The inclusion of the resistor 502 in series with the shunt field 496 tends to slightly reduce the shunt field current, which in itself tends to increase the maximum speed of the motor. However, since the motor is running at practically no load, the armature and series field 497 do not draw an excessive amount of current.

(F) *The cylinder motor*

The cylinder motor 339 is used to rotate the oxygenating device (see Figs. 19 and 20). This motor is similar in construction to the pulse motor described above, in that the shunt field 509 is connected via a limiting resistor 511 across the direct current supply busses 387, 388. The armature and series field 510 are connected across the D. C. output of the rectifier 507. The armature and series field are shunted by a condenser 508. The alternating voltage for the rectifier 507 is supplied through a protective fuse 506 from the variable autotransformer 505, which is connected across the alternating current supply busses 382, 383. In series with the variable autotransformer 505 across the alternating current supply busses 382, 383, is a switch 512, which permits the cylinder motor to be disconnected and shut off.

The operation of the cylinder motor is identical with that described above for the pulse motor.

(G) *Vein pump control system*

The electric circuits for the vein pump control system are illustrated on Fig. 24c. The vein pump control circuits may be considered as made up of a motor circuit and a control circuit responsive to the level of blood in the vein pump control tube 115, as illustrated in Fig. 8. In operation, the motor circuit will be controlled by the control circuit.

We will first describe the motor circuit. The shunt field 517 of the vein pump motor 342 is connected across the direct current supply busses 387 and 388 through a resistor 519. The armature and series field 518 of the motor 342 are energized from the direct current output of a rectifier 521. The rectifier 521 is supplied by alternating current from a variable autotransformer 520 connected through a switch 548 across the alternating current supply busses 382, 383. A protective fuse 522 is included in the input circuit of the rectifier 521. Connected across the direct current output of the rectifier 521 is a condenser 523. Included in the armature circuit of the motor 342 is a set of transfer points 530a, the armature 544 of which is normally connected to the direct current supply via the point 544a. The other point 544b is in series with a resistor 545, and when said point 544b is contacted by the armature 544, the resistor 545 is paralleled across the armature and series field 518 of the motor 342. The set of transfer points 530a are shunted by a resistor 546 and a condenser 547. Included in the control circuit is a switch 527. When this switch 527 is open the control circuit is inactive and the manual operation of the motor circuit is the same as that described in connection with the pulse motor and cylinder motor circuits above.

The control circuit may generally be described as a vacuum tube circuit utilized to energize a relay coil, which in turn actuates the set of transfer points 530a in the motor circuit. The control circuit is actuated by a photocell, which in turn is responsive to the level of the blood in the tube 115, as shown in Fig. 8. The relay energizing coil 530 is disposed in the plate circuit of the vacuum tube 531. The energizing coil 530 is paralleled by a holding circuit, including the condenser 532 and the resistor 533. The plate is supplied from the direct current supply bus 387 through the manually operated switch 527 and the set of transfer points 389a. The energizing coil 389 for the transfer points 389a is included in the time delay circuits described above. Actuation of the transfer points 389a completes the plate circuit of the tube 531 a predetermined interval of time after the filaments 535 have been energized. The switch 527 provides for either manual or automatic operation of the motor circuit. In automatic operation, the switch completes the plate circuit of the tube 531. In the manual position, i. e., the position illustrated in the drawings, the control circuit will be inoperative.

The bias for the grid 538 of the tube 531 is supplied from the negative side of a rectifier 536 through the resistor 537. The rectifier 536 is connected across the secondary of a transformer 534, the primary of which is connected across the alternating supply busses 382 and 383. The secondary of the transformer 534 also supplies the voltage for the filaments 535 of the tube 531.

When the switch 527 is closed, the operation of the motor circuit is, in effect, controlled by the photocell 119 (see Fig. 8). The potential on the photocell 119 is regulated by setting the potentiometer 528, which is connected across the direct current supply busses 387 and 388. When the level of blood in the tube 115 separating the photocell 119 and the light source of the control assembly falls (see Fig. 8), it means that the supply of blood does not meet the demands of the vein pump and that an occlusion has taken place. When this happens, the vein pump should stop immediately to permit the occlusion to break open. Thus, when the photocell 119 sees light, its resistance decreases and it starts to conduct current. As the resistance of the photocell 119 is decreased, the voltage on the grid 538 is raised, allowing the tube 531 to conduct more heavily. The increase in current flow is sufficient to energize the relay coil 530, which in turn actuates the set of transfer points 530a in the motor circuit. The armature 544 of the set of transfer points 530a moves from its normal position in contact with the point 544a into contact with the point 544b. This action effectively disconnects the armature and series field 518 from one side of the line and connects it across the resistance 545 to virtually short-circuit the armature and series field. This brakes the motor 342 and stops it in a very few revolutions. The value of the resistance 545 determines the number of revolutions the motor 342 makes before coming to a stop.

In addition, the energization of the relay coil 530 actuates the set of transfer points 530b in such a manner as to connect the vein occlusion signal light 542 across the alternating current supply busses 382 and 383. The completion of this circuit causes the light 542, which is located on the control panel 13 of the power, indicator and control cabinet 10, to light, thus signalling the operator that the vein pump has stopped.

After the occlusion opens, the blood again will rise in the glass tube 115. The rise in the level of blood shuts the light off from the photocell 119. This causes an increase in the resistance of the cell 119, which in turn causes the voltage on the grid 538 to be lowered. The lowering of the grid voltage will cause the tube 531 to conduct less heavily and the plate current will thus decrease. When the plate current decreases to a point insufficient to maintain the energization of the coil 539, the armature 544 returns to its normal contact with the point 544a. This action disconnects the armature and series field 519 of the motor 342 from the braking resistance 545 and reconnects them to the direct current supply. In addition, the circuit including the vein occlusion signal light 542, is opened, and the light on the control panel goes out.

If the blood proportioning device is included and utilized in the blood circulation components, the grid 533 of the tube 531 is connected to the direct current supply bus 387 through the resistor 541 and the parallel set of transfer points 466d and 467d. These transfer points 466d and 467d are actuated by the energizing coils 466 and 467 disposed in the blood proportioning device circuits described above. In effect, this added circuit bypasses the photocell 119 and controls the operation of the motor circuit to the exclusion of the photocell circuit herein described except in the case when both veins occlude at the same time, as explained above.

(H) *The artery pump control system*

The circuits for the artery pump control system are illustrated in Fig. 24c. The artery pump control may be considered as a motor circuit and a control circuit, which, on automatic operation, is used to control the operation of the motor circuit. When set for manual operation, the switch 561 is in the position shown in the drawings and connects the armature and series field 556 of the motor 353 across the direct current side of the rectifier 557. The shunt field 555 is connected through the resistor 554 to the direct current supply busses 387 and 388. Also connected across the direct current side of the rectifier 557 is a condenser 560. Alternating potential is supplied to the rectifier 557 from the variable autotransformer 558, which is connected across the alternating current supply busses 382 and 383 through a suitable switch, not shown. A protective fuse 559 is included in the input circuit of the rectifier 557. Since the speed of the motor 353 is a function of the current flowing therethrough, the speed may be manually controlled by varying the potential applied to the rectifier 557.

When set for automatic operation, the switch 561 being connected to the terminals 561a and 561b, the current flowing through the armature and series field 556 of the motor 353 is obtained from the common cathode circuit of a pair of thyratrons 562 and 563 connected in push-pull arrangement. Intermediate the armature and series field 556 and the common cathode circuit of the thyratrons 562 and 563 are a set of transfer points 398a responsive to the energizing of coil 398. The energizing coil 398 is disposed in the time delay circuits (see Fig. 24b). When the transfer points 398a are open, the cathode circuit of the thyratrons 562 and 563 is open and the control circuit is inoperative.

The control circuit may be briefly described as a circuit which regulates the amount of current flowing through the motor 358 by controlling the amount of current flowing in the common cathode circuit of the thyratrons 562 and 563. The amount of current that flows in the cathode circuit is governed by the point in the cycle at which the thyratrons are fired. An alternating potential is applied to the plates 569 and 570 of the thyratrons 562 and 563, respectively, so that each stops conducting when its plate voltage goes to zero once every cycle. The potential on the plate 569 is 180° out of phase with the potential present on the plate 570 at any given instant. This is accomplished by a phase shifting network, including the autotransformer 571 and the variable autotransformer 572. The thyratrons 562 and 563 are in push-pull arrangement and hence, one thyratron will conduct during the first half cycle and the other will conduct during the second half cycle. The current flowing in the cathode circuit, as a result of the above type of operation, is a full-wave rectified current, and this current is applied to the armature and series field 556 of the motor 353.

By controlling the phase and magnitude of the voltage applied to the grids 573 and 574 of the thyratrons 562 and 563, respectively, the portion of the half cycle during which each tube conducts may be regulated. Since the current flow through each thyratron is regulated, the total current flowing in the common cathode circuit is also regulated.

The particular method of controlling utilized consists in applying an alternating potential to the grids 573 and 574 of the thyratrons, which lags the respective voltages on the plates 569 and 570, respectively, by 90 electrical degrees. This alternating voltage applied to the grids is superimposed on a direct current potential, and by controlling the magnitude of this direct current potential, an effective control of the firing of the thyratrons is obtained.

The alternating potential which is applied to the grids 573 and 574, respectively, of the thyratrons 562 and 563 so as to be 90 electrical degrees out of phase with the potentials upon the plates 569 and 570, respectively, is supplied from the transformers 577 and 578 and a phase shifting network, including the phase shifting potentiometer 579 and the condenser 580. This potential is applied across the autotransformer 581 and is applied to the grid 573 through a resistor 575 and to the grid 574 through a resistor 576. The primary of the transformer 577 is connected across the alternating current supply busses 382 and 383.

The direct current potential applied to the grids 573 and 574 is applied through the center tap of the autotransformer 581. The artery photocell 255 is included in the grid circuit of a vacuum tube 582. The plate potential for the tube 582 is supplied by the rectifier 594. The rectifier 594 is supplied with alternating potential from the secondary of a transformer 593, the primary of which is connected across the alternating current supply busses 382 and 383. The output of the rectifier 594 is filtered by a conventional filter, including the condensers 595, 596, and the choke 597. The rectifier output is applied across a potentiometer 599, the movable tap of which applies a positive potential relative to the negative side of the rectifier 594 to the common cathodes of the thyratrons 562 and 563, and to the center tap of the secondary of the filament transformer 566. The primary of the transformer 566 is connected across the alternating current supply busses 382 and 383. The plate supply for the tube 582 is taken from the positive side of the potentiometer 599 through the plate load resistor 591, which is paralleled by the condenser 593a.

The photocell 255 is connected in the grid circuit of the vacuum tube 582 between a potential divider, including resistors 589 and 590, and a grid biasing resistor 588. The cathode 585 of the vacuum tube 582 is biased by the resistor 586 and the condenser 587. The filaments 584 of the vacuum tube 582 are connected across the secondary of the filament transformer 583, the primary of which is connected across the alternating current supply busses 382 and 383.

The photocell 255, being responsive to the amount of light received from its light source, effectively varies the grid voltage on the vacuum tube 582 and thus varies the plate current. The variation in plate current varies the voltage across the plate load resistor 591, which is connected between the grid and cathode of each of the thyratrons.

In order to fire the thyratrons, the alternating current voltage applied to the grids 573 and 574, respectively, must be shifted to a potential level which makes the grids 573 and 574 sufficiently positive with respect to the cathodes 567 and 568, respectively. This is accomplished by shifting the direct current bias. When the light to the photocell 255 is cut off by the blood in the collector cup, the critical grid voltage curve of the thyratron is being cut right near the point at which the plate voltage starts to increase. Thus, the tube is fired for its maximum length of time. This results in the armature current through the motor 358 approximating its maximum value and thus the motor runs at maximum speed. When there is full light on the photocell 255, the direct current bias is low, the grid voltages never reach their critical firing value, and thus the thyratrons 562 and 563 do not fire at all. When the thyratrons are non-conducting, no current flows through the motor 358, and hence, the motor is stopped.

In actual operation, the circuit constants are designed so that even with full light on the photocell 255, the critical grid voltage curves for the thyratrons will be cut, but the time that the tubes 562 and 563 are conducting is so short, that the average current flowing through the motor 358 will be insufficient to make it turn.

For smooth operation and to prevent hunting, it is best to keep the gain of the tube 582, which supplies the direct current bias for the thyratrons, at a value that will insure the stoppage of the motor and will also assure the running of the motor at a slightly greater speed than that of the vein pump motor 342. If the gain of the tube 582 is made too large, small variations in the level of blood in the collector cup will cause large variations in the direct current bias of the thyratrons 562 and 563 and cause the motor 358 to hunt.

(I) *Miscellaneous electrical components*

The light sources for the photocells are illustrated in Fig. 24a. The supply potential for the light sources for the photocells in the artery and vein pump control circuits is obtained from a variable autotransformer 605, which is connected across the alternating supply. Connected across the variable autotransformer is a transformer 606, and connected in parallel across the secondary of this transformer are the light sources 607, 608 and 609. The light source 607 is the light source for the vein pump control assembly. The light sources 608 and 609 are for the artery pump control assembly.

The presently preferred light sources for the control circuits are lamps designed for operation upon 12 to 16 volts.

Also included in the power, indicator and control assembly is a clock 610. This clock is connected across the alternating current supply busses 382 and 383 through a switch 611. The clock has been added to the oxygenator assembly to provide a convenient time indicator during experimental operations.

Also included among the electrical components of the extracorporeal circulation device is a temperature indicating system illustrated in Fig. 25. In order to provide a continual indication of the temperatures in the oxygenator assembly cabinet 1, the gas supply duct 242, the arterial blood stream and the venous blood stream, a plurality of thermocouples, such as those schematically represented at 650 through 653, are included. The thermocouples utilized to indicate the temperature of the arterial and venous blood streams are preferably located in the vein and artery pump pulsation eliminators. The cold junction 654 may be placed in a suitable receptacle on the power, indicator and control cabinet 10. A meter 655 and a master switch 656 complete the thermocouple assembly.

In accordance with the provisions of the patent statutes, we have herein described the principle of operation of this invention, together with the elements which we now consider the best embodiments thereof, but we desire to have it understood that the structure disclosed is only illustrative and the invention can be carried out by other means. Also, while it is designed to use the various features and elements in the combinations and relations described, some of these may be altered and modified without interfering with the more general results outlined and the invention extends to such use within the scope of the appended claims.

We claim:

1. An extracorporeal circulation device comprising, in combination, means for introducing oxygen into a flowing blood stream, a venous blood system intermediate said first mentioned means and a blood source, including, pumping means for moving venous blood from said source to said oxygenating means, light-responsive control means associated with said venous pumping means sensitive to occlusion of said blood source for controlling the rate of pumping of said pumping means; an arterial blood system intermediate said first mentioned means and a blood receiver including arterial pumping means for moving arterial blood from said oxygenating means to said blood receiver, control means associated with said arterial pumping means responsive to the rate of blood flow for controlling the rate of pumping of said arterial pumping means, an insulated housing enclosing said oxygenating means and said venous and arterial blood systems, an air circulatory system contained within said housing, heating means disposed in said air circulatory system, and control means responsive to the air temperature for regulating said heating means whereby said extracorporeal circulation device is maintained at a predetermined temperature.

2. An extracorporeal circulation device comprising, in combination, means for introducing oxygen into a flowing blood stream, a venous blood system intermediate said first mentioned means and a blood source, including, pumping means for moving venous blood from said source to said oxygenating means, control means associated with said venous pumping means sensitive to occlusion of said blood source for controlling the rate of pumping of said pumping means; an arterial blood system intermediate said first mentioned means and a blood receiver including arterial pumping means for moving arterial blood from said oxygenating means to said blood receiver, control means associated with said arterial pumping means responsive to the rate of blood flow for controlling the rate of pumping of said arterial pumping means, an insulated housing enclosing the oxygenating means and the venous and arterial blood systems, an air circulatory system contained within said housing, heating means included in said air circulatory system, a control system responsive to the temperature of the circulating air for controlling said heating means whereby all the elements contained within said insulated housing are maintained at a predetermined operating temperature level, and means included within said control system responsive to a temperature level higher than the operating temperature level for providing a higher initial temperature during preheating operations.

3. An extracorporeal circulation device comprising, in combination, means for introducing oxygen into a flowing blood stream, a venous blood system intermediate said first mentioned means and a blood source, including, pumping means for moving venous blood from said source to said oxygenating means, control means associated with said venous pumping means sensitive to occlusion of said blood source for controlling the rate of pumping of said pumping means; an arterial blood system intermediate said first mentioned means and a blood receiver including arterial pumping means for moving arterial blood from said oxygenating means to said blood receiver, control means associated with said arterial pumping means responsive to the rate of blood flow for controlling the rate of pumping of said arterial pumping means, an insulated housing enclosing the oxygenating means and the venous and arterial blood systems, an integral air circulatory system contained within said housing including a recirculation duct and means to move the air through said duct, heating means disposed in said duct, a control system, including a plurality of thermoregulating members, responsive to the temperature of the air in said duct for regulating said heating means whereby the elements contained within said housing are maintained at a predetermined temperature.

4. An extracorporeal circulation device comprising, in combination, means for introducing oxygen into a flowing film of venous blood; a venous blood system intermediate said first mentioned means and a venous blood source, including, a pump for moving venous bood from said source to said oxygenating means, a blood reservoir, a photocell assembly responsive to the level of venous blood in said reservoir, control means responsive to said photocell assembly for controlling the rate of pumping of said pump; an arterial blood system to receive the oxygenated blood from said first mentioned means, including, an arterial blood pump for moving the arterial blood out of the extracorporeal circulation device, an arterial blood reservoir adjacent said first mentioned means, a second photocell assembly adjacent thereto responsive to the level of arterial blood in said arterial blood reservoir, second control means responsive to said second photocell assembly for controlling the rate of pumping of said arterial blood pump; an insulated housing enclosing said first mentioned means and said venous and arterial blood systems; an air circulatory system contained within said housing; heating means disposed within said air circulatory system, and third control means responsive to a departure from a predetermined operating temperature for regulating the application of power to said heating means to correct said departure from said predetermined operating temperature.

5. An extracorporeal circulation device comprising, in combination, means for introducing oxygen into a flowing film of venous blood; a venous blood system intermediate said first mentioned means and a venous blood source, including, a pump for moving venous blood from said source to said oxygenating means, a blood reservoir, a photocell assembly responsive to the level of venous blood in said reservoir, control means responsive to said photocell assembly for controlling the rate of pumping of said pump; an arterial blood system to receive the oxygenated blood from said first mentioned means, including, an arterial blood pump for moving the arterial blood out of the extracorporeal circulation device, an arterial blood reservoir adjacent said first mentioned means, a second photocell assembly adjacent thereto responsive to the level of arterial blood in said arterial blood reservoir, second control means responsive to said second photocell assembly for controlling the rate of pumping of said arterial blood pump; an insulated housing enclosing said first mentioned means and said venous and arterial blood systems; an air circulatory system contained within said housing, heating means disposed within said air circulatory system, third control means responsive to the temperature of the circulating air for regulating the application of power to said heating means whereby all the elements contained within said insulated housing are maintained at a predetermined operating temperature, and means included within said third control means responsive to a temperature higher than the operating temperature for preheating operation.

6. An extracorporeal circulation device comprising, in combination, means for introducing oxygen into a flowing film of venous blood; a venous blood system intermediate said first mentioned means and a venous blood source, including, a pump for moving venous blood from said source to said oxygenating means, a blood reservoir, a photocell assembly responsive to the level of venous blood in said reservoir, control means responsive to said photocell assembly for controlling the rate of pumping of said pump; an arterial blood system to receive the oxygenated blood from said first mentioned means, including, an arterial blood pump for moving the arterial blood out of the extracorporeal circulation device, an arterial blood reservoir adjacent said first mentioned means, a second photocell assembly adjacent thereto responsive to the level of arterial blood in said arterial blood reservoir, second control means responsive to said second photocell assembly for controlling the rate of pumping of said arterial blood pump; an insulated housing enclosing said first mentioned means and said venous and arterial blood systems; an air circulatory system contained within said housing, including a recirculation duct and means to move the air through said duct, a heating element disposed in said duct, and third control means including a plurality of thermoregulating members responsive to a departure from a predetermined operating temperature for regulating the application of power to said heating element whereby a constant operating temperature is maintained.

7. An extracorporeal circulation device comprising, in combination, oxygenating means for introducing oxygen into a flowing film of venous blood, said oxygenating means including manually controlled means for regulating the amount of oxygen introduced into the flowing venous blood; a venous blood system intermediate said oxygenating means and a venous blood source, including, a pump for moving venous blood from said source to said oxygenating means, first control means associated with said pump sensitive to occlusion of said blood source for automatically regulating said pump; an arterial blood system to receive the oxygenated blood, including, a second pump for moving the oxygenated blood through said arterial blood system, second control means associated with said second pump sensitive to arterial blood flow for automatically regulating said second pump; an insulated housing enclosing said oxygenating means and said arterial and venous blood systems; an air circulatory system contained within said housing including an air heating element, third control means responsive to the departure of the temperature of the air contained within said circulatory system from a predetermined operating temperature for automatically regulating the application of power to said heating element whereby a constant operating temperature is maintained; a gas supply system for supplying oxygen to the oxygenating means, a heating element included in said gas supply system, fourth control means responsive to the departure of the gas temperature from a predetermined operating temperature for automatically regulating the application of power to said gas heating element, said third and fourth control means cooperating to maintain a predetermined operating temperature.

8. An extracorporeal circulation device comprising, in combination, oxygenating means for introducing oxygen into a flowing film of venous blood, said oxygenating means including manually controlled means for regulating the amount of oxygen introduced into the flowing venous blood; a venous blood system intermediate said oxygenating means and a venous blood source, including, a pump for moving venous blood from said source to said oxygenating means, first control means associated with said pump sensitive to occlusion of said blood source for automatically regulating said pump; an arterial blood system to receive the oxygenated blood, including, a second pump for moving the oxygenated blood through said arterial blood system, second control means associated with said second pump sensitive to arterial blood flow for automatically regulating said second pump; an insulated housing enclosing said oxygenating means and said arterial and venous blood systems; and an air circulatory system contained within said housing including, a recirculation duct, an air heating element disposed within said duct and third control means responsive to a departure of the air temperature contained within said recirculation duct from a predetermined operating temperature for automatically regulating the application of power to said air heating element whereby said operating temperature is maintained constant.

9. An extracorporeal circulation device comprising, in combination, oxygenating means for introducing oxygen into a flowing film of venous blood, said oxygenating means including manually controlled means for regulating the amount of oxygen introduced into the flowing venous blood; a venous blood system intermediate said oxygenating means and a venous blood source, including, a pump for moving venous blood from said source to said oxygenating means, first control means associated with said pump sensitive to occlusion of said blood source for automatically regulating said pump; an arterial blood system to receive the oxygenated blood, including, a second pump for moving the oxygenated blood through said arterial blood system, second control means associated with said second pump sensitive to arterial blood flow for automatically regulating said second pump; and an insulated housing enclosing said oxygenating means and said arterial and venous blood systems.

10. An extracorporeal circulation device, comprising, in combination, oxygenating means for introducing oxygen into a flowing stream of venous blood, said oxygenating means including a manually operable means for regulating the amount of oxygen introduced into the flowing venous blood; a venous blood system intermediate said oxygenating means and a venous blood source, including, pumping means for moving venous blood from said source to said oxygenating means, a deformable pulsation eliminator for removing the pulsations introduced into the flowing venous blood by said pumping means, said pulsation eliminator disposed intermediate said pumping means and said oxygenating means, first control means sensitive to occlusion of the blood source associated with said venous pumping means for automatically regulating the pumping rate of said pumping means; an arterial blood system for receiving the oxygenated blood from said oxygenating means including, arterial pumping means for moving the oxygenated blood through the arterial blood system, a second deformable pulsation eliminator for removing the pulsations introduced into the flowing arterial blood by said arterial pumping means, second control means sensitive to the rate of arterial blood flow for automatically regulating the pumping rate of the arterial pumping means; a pulsator assembly included in said arterial blood system for introducing a measured controlled pulsation into the flowing arterial blood, an insulated housing enclosing said oxygenating means and said venous and arterial blood systems; an air circulatory system contained within said housing, including, an air circulation duct, a heating element disposed within said duct, third control means responsive to a decrease of air temperature from a predetermined operating temperature for automatically energizing said heating element to return said air temperature to said predetermined operating temperature whereby said operating temperature is maintained constant; and a gas supply system for supplying oxygen to the oxygenating means, including, a gas heating element, and fourth control means responsive to a departure of the gas temperature from a predetermined operating temperature for automatically regulating the application of power to said gas heating element.

11. An extracorporeal circulation device, comprising, in combination, oxygenating means for introducing oxygen into a flowing stream of venous blood, said oxygenating means including a manually operable means for regulating the amount of oxygen introduced into the flowing venous blood; a venous blood system intermediate said oxygenating means and a venous blood source, including, pumping means for moving venous blood from said source to said oxygenating means, a pulsation eliminator for removing the pulsations introduced into the flowing venous blood by said pumping means, said pulsation eliminator disposed intermediate said pumping means and said oxygenating means, first control means sensitive to occlusion of the blood source associated with said venous pumping means for automatically regulating the pumping rate of said pumping means; an arterial blood system for receiving the oxygenated blood from said oxygenating means including, arterial pumping means for moving the oxygenated blood through the arterial blood system, a second pulsation eliminator for removing the pulsations introduced into the flowing arterial blood by said arterial pumping means, second control means sensitive to the rate of arterial blood flow for automatically regulating the pumping rate of the arterial pumping means; a pulsator assembly included in said arterial blood system for introducing a measured controlled pulsation into the flowing blood, an insulating housing enclosing said oxygenating means and said arterial and venous blood systems; and an air circulatory system contained within said housing, including, an air recirculation duct, an air heating element disposed within said duct, and third control means responsive to a departure of the air temperature from a predetermined operating temperature for automatically regulating the application of power to said air heating element whereby said operating temperature is maintained constant.

12. An extracorporeal circulation device, comprising, in combination, oxygenating means for introducing oxygen into a flowing stream of venous blood, said oxygenating means including a manually operable means for regulating the amount of oxygen introduced into the flowing venous blood; a venous blood system intermediate said oxygenating means and a venous blood source, including, pumping means for moving venous blood from said source to said oxygenating means, a pulsation eliminator for removing the pulsations introduced into the flowing venous blood by said pumping means, said pulsation eliminator disposed intermediate said pumping means and said oxygenating means, first control means sensitive to occlusion of the blood source associated with said venous pumping means for automatically regulating the pumping rate of said pumping means; an arterial blood system for receiving the oxygenated blood from said oxygenating means including, arterial pumping means for moving the oxygenated blood through the arterial blood system, a second pulsation eliminator for removing the pulsations introduced into the flowing arterial blood by said arterial pumping means, second control means sensitive to the rate of arterial blood flow for automatically regulating the pumping rate of the arterial pumping means and a pulsator assembly included in said arterial blood system for introducing a measured controlled pulsation into the flowing arterial blood.

13. An extracorporeal circulation device, comprising, in combination, oxygenating means for introducing oxygen into a flowing stream of venous blood, said oxygenating means including manually operable means for regulating the amount of oxygen introduced into the flowing venous blood; a venous blood system intermediate said oxygenating means and a source of venous blood, including, pumping means for moving venous blood from said source to said oxygenating means, a pulsation eliminator for removing the pulsations introduced into the flowing venous blood by said pumping means, said pulsation eliminator disposed intermediate said pumping means and said oxygenating means, a vein cuvette assembly disposed between said pumping means and said venous blood source for providing a continuous indication of the oxygen content of the venous blood, a blood reservoir open to the venous blood, a photocell assembly adjacent thereto and responsive to the level of venous blood in said reservoir, first control means responsive to said photocell assembly for controlling the rate of pumping of said pumping means; an arterial blood system to receive the oxygenated blood from said oxygenating means, including, an arterial blood pump for moving the arterial blood through the arterial blood system, an arterial blood reservoir adjacent said oxygenating means, a second photocell assembly adjacent to said arterial blood reservoir and responsive to the level of arterial blood therein, second control means responsive to said second photocell assembly for controlling the rate of pumping of said arterial blood pump, a second pulsation eliminator adjacent said arterial blood pump for removing the pulsations introduced into said arterial blood by said arterial blood pump, an arterial cuvette assembly exposed to said flowing arterial blood for providing a continuous indication of the oxygen content of the arterial blood, and a pulsator assembly to reintroduce a measured controlled pulsation into the flowing arterial blood.

14. An extracorporeal circulation device, comprising, in combination, oxygenating means for introducing oxygen into a flowing stream of venous blood, said oxygenating means including manually operable means for regulating the amount of oxygen introduced into the flowing venous blood; a venous blood system intermediate said oxygenating means and a source of venous blood, including, pumping means for moving venous blood from said source to said oxygenating means, a pulsation eliminator for removing the pulsations introduced into the flowing venous blood by said pumping means, said pulsation eliminator disposed intermediate said pumping means and said oxygenating means, a vein cuvette assembly disposed between said pumping means and said venous blood source for providing a continuous indication of the oxygen content of the venous blood, a blood reservoir open to the venous blood, a photocell assembly adjacent thereto and responsive to the level of venous blood in said reservoir, first control means responsive to said photocell assembly for controlling the rate of pumping of said pumping means; an arterial blood system to receive the oxygenated blood from said oxygenating means, including, an arterial blood pump for moving the arterial blood through the arterial blood system, an arterial blood reservoir adjacent said oxygenating means, a second photocell assembly adjacent to said arterial blood reservoir and responsive to the level of arterial blood therein, second control means responsive to said second photocell assembly for controlling the rate of pumping of said arterial blood pump, a second pulsation eliminator adjacent said arterial blood pump for removing the pulsations introduced into said arterial blood by said arterial blood pump, an arterial cuvette assembly exposed to said flowing arterial blood for providing a continuous indication of the oxygen content of the arterial blood, and a pulsator assembly to reintroduce a measured controlled pulsation into the flowing arterial blood; an insulated housing enclosing said oxygenating means and said venous and arterial blood system; and an air circulatory system contained within said housing, including, third control means responsive to the departure of the air temperature from a predetermined operating temperature for automatically actuating a heating element whereby said operating temperature is maintained constant.

15. An extracorporeal circulation device, comprising, in combination, oxygenating means for introducing oxygen into a flowing stream of venous blood, said oxygenating means including manually operable means for regulating the amount of oxygen introduced into the flowing venous blood; a venous blood system intermediate said oxygenating means and a source of venous blood, including, pumping means for moving venous blood from said source to said oxygenating means, a pulsation eliminator for removing the pulsations introduced into the flowing venous blood by said pumping means, said pulsation eliminator disposed intermediate said pumping means and said oxygenating means, a vein cuvette assembly disposed between said pumping means and said venous blood source for providing a continuous indication of the oxygen content of the venous blood, a blood reservoir open to the venous blood, a photocell assembly adjacent thereto and responsive to the level of venous blood in said reservoir, first control means responsive to said photocell assembly for controlling the rate of pumping of said pumping means; an arterial blood system to receive the oxygenated blood from said oxygenating means, including, an arterial blood pump for moving the arterial blood through the arterial blood system, an arterial blood reservoir adjacent said oxygenating means, a second photocell assembly adjacent to said arterial blood reservoir and responsive to the level of arterial blood therein, second control means responsive to said second photocell assembly for controlling the rate of pumping of said arterial blood pump, a second pulsation eliminator adjacent said arterial blood pump for removing the pulsations introduced into said arterial blood by said arterial blood pump, an arterial cuvette assembly exposed to said flowing arterial blood for providing a continuous indication of the oxygen content of the arterial blood, and a pulsator assembly to reintroduce a measured controlled pulsation into the flowing arterial blood; an insulated housing enclosing said oxygenating means and said venous and arterial blood systems; an air circulatory system contained within said housing, including an air circulation duct, a heating element contained within said duct, third control means responsive to a decrease of the air temperature from a predetermined operating temperature for automatically energizing said heating element to return said air temperature to said predetermined operating temperature whereby said operating temperature is maintained constant; and a gas supply system for supplying oxygen to the oxygenating means, including, a gas heating element included therein and fourth control means responsive to a departure of the gas temperature from a predetermined operating temperature for automatically regulating the application of power to said gas heating element, whereby said gas temperature is maintained constant.

16. An extracorporeal circulation device, comprising, in combination, oxygenating means for introducing oxygen into a flowing film of venous blood, a venous blood system intermediate said oxygenating means and a plurality of sources of venous blood, a pump for moving the venous blood from said sources to said oxygenating means, first control means associated with said venous pumping means sensitive to occlusion of said blood source for controlling the rate of pumping of said pumping means and a blood flow proportioning device intermediate said pump and said sources of venous blood for proportioning the flow of venous blood from each of said plurality of sources, means included in said proportioning device responsive to a pressure unbalance between said plurality of sources, for actuating correcting means to relieve said unbalance, auxiliary means included in said proportioning device sensitive to a pressure unbalance between said plurality of sources for controlling the rate of pumping of said pumping means; and an arterial blood system intermediate said first mentioned means and a blood receiver, including, arterial pumping means for moving arterial blood from said oxygenating means to said blood receiver, and second control means associated with said arterial pumping means responsive to the rate of blood flow for controlling the rate of pumping of said arterial pumping means.

17. An extracorporeal circulation device, comprising, in combination, oxygenating means for introducing oxygen into a flowing film of venous blood, a venous blood system intermediate said oxygenating means and a plurality of sources of venous blood, a pump for moving the venous blood from said sources to said oxygenating means, first control means associated with said venous pumping means sensitive to occlusion of said blood source for controlling the rate of pumping of said pumping means and a blood flow proportioning device intermediate said pump and said sources of venous blood for proportioning the flow of venous blood from each of said plurality of sources, means included in said proportioning device responsive to a pressure unbalance between said plurality of sources, for actuating correcting means to relieve said unbalance, auxiliary means included in said proportioning device sensitive to a pressure unbalance between said plurality of sources for controlling the rate of pumping of said pumping means; an arterial blood system intermediate said first mentioned means and a blood receiver, including, arterial pumping means for moving arterial blood from said oxygenating means to said blood receiver, second control means associated with said arterial pumping means responsive to the rate of blood flow for controlling the rate of pumping of said arterial pumping means; an insulated housing enclosing said oxygenating means and said venous and arterial blood systems; and an air circulatory system contained within said housing, air heating means disposed within said air circulatory system, third control means responsive to a departure of the air temperature from a predetermined operating temperature for actuating said heating means whereby said operating temperature is maintained constant.

18. In an extracorporeal circulation device of the type described, a blood flow proportioning device to prevent vein occlusion when drawing blood from a plurality of veins, comprising, resilient passage means for containing the flow of venous blood, differential pressure responsive means responsive to a pressure unbalance in said passage means, and means responsive to said pressure responsive means for correcting a pressure unbalance in said resilient passage means.

19. In an extracorporeal circulation device of the type described, a blood flow proportioning device to prevent vein occlusion when drawing blood from a plurality of veins, comprising, compressible tubular members for containing the flow of venous blood, differential pressure responsive means for sensing a departure from a predetermined differential pressure balance in said tubular members, including, expanded chambers connected to said tubular members, resilient diaphragm members deformably responsive to pressure variation in said tubular members forming at least one wall of each of said chambers, and switching means responsive to the deformation of said diaphragms; a reversible motor actuated by said switching means, and means actuated by said motor for compressing the tubular member having a decreased pressure therein whereby said pressure unbalance is corrected.

20. In an extracorporeal circulation device of the type described control apparatus responsive to the rate of flow of arterial blood comprising, means for pumping the arterial blood, a compound wound direct current motor having its shunt field energized by a first direct current source and its armature and series field energized by a second direct current source for supplying power to the pumping means, means for sensing a departure from a predetermined rate of blood flow including, a blood reservoir, a light source adjacent one side of said reservoir, a photocell adjacent the other side of said reservoir responsive to the light emitted from said light source, the blood level in said reservoir regulating the amount of light received by said photocell, and means responsive to the amount of light received by said photocell for regulating the flow of current through the armature and series field of said motor.

21. In an extracorporeal circulation device of the type described, control apparatus responsive to venous occlusion comprising, means for pumping venous blood, a compound wound direct current motor for supplying power to the pumping means, means for sensing venous occlusion including, a housing member shaped to provide a path for blood flow, an enlarged venous blood reservoir adjacent to said path, a light emitting source adjacent to one side of said reservoir, a photocell adjacent the other side of said reservoir responsive to the light emitted from said light source, the blood level in said reservoir regulating the amount of light received by said photocell, means responsive to the amount of light received by said photocell for removing the armature and series field of said motor from a direct current power source and connecting said armature and series field across a resistor whereby said motor and said pump are rapidly halted.

JOHN H. GIBBON, JR.
GUSTAV V. A. MALMROS.
JOHN R. ENGSTROM.
EDMUND A. BARBER, JR.

References Cited in the file of this patent

UNITED STATES PATENTS

| Number | Name | Date |
|---|---|---|
| 1,290,647 | Nyvall | Jan. 7, 1919 |
| 1,739,373 | Race | Dec. 10, 1929 |
| 2,051,320 | States | Aug. 18, 1936 |
| 2,172,222 | Podbielniak | Sept. 5, 1939 |
| 2,241,743 | Schoene | May 13, 1941 |
| 2,281,616 | Placek | May 5, 1942 |
| 2,308,516 | Knott | Jan. 19, 1943 |
| 2,406,207 | Desmet | Aug. 20, 1946 |
| 2,474,665 | Guarino | June 28, 1949 |

OTHER REFERENCES

Mechanical Heart and Lungs, published in Time on Sept. 26, 1949, but extending experimentally fifteen years earlier. Page 42 of the publication in question.

"Coronet" Magazine, Sept. 1950, page 142.